United States Patent
Ye et al.

(12)

(10) Patent No.: US 12,276,776 B2
(45) Date of Patent: Apr. 15, 2025

(54) OPTICAL IMAGING SYSTEM

(71) Applicant: Zhejiang Sunny Optics Co., Ltd, Yuyao (CN)

(72) Inventors: Lihui Ye, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 537 days.

(21) Appl. No.: 17/538,490

(22) Filed: Nov. 30, 2021

(65) Prior Publication Data

US 2022/0196986 A1 Jun. 23, 2022

(30) Foreign Application Priority Data

Dec. 17, 2020 (CN) .......................... 202011494844.8

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC ............................... G02B 9/64; G02B 13/0045
See application file for complete search history.

(56) References Cited

U.S. PATENT DOCUMENTS

| | | | | |
|---|---|---|---|---|
| 8,385,008 B2* | 2/2013 | Hsieh | ................. | G02B 13/0045 359/755 |
| 10,649,201 B2* | 5/2020 | Takato | ................... | G02B 13/04 |
| 11,067,777 B2* | 7/2021 | Lyu | ........................ | G02B 13/04 |
| 11,150,462 B2* | 10/2021 | Takato | ..................... | G02B 9/12 |
| 11,567,295 B2* | 1/2023 | Jiang | ..................... | G02B 13/06 |

(Continued)

FOREIGN PATENT DOCUMENTS

| CN | 102645728 A | 8/2012 |
|---|---|---|
| CN | 105988193 A | 10/2016 |

(Continued)

OTHER PUBLICATIONS

Notice of Allowance for Chinese Application No. 112462501A, dated Feb. 21, 2025, 5 pages.

*Primary Examiner* — Christopher Stanford
(74) *Attorney, Agent, or Firm* — Barnes & Thornburg LLP

(57) ABSTRACT

Embodiments of the present disclosure provide an optical imaging system that comprising, sequentially from an object side to an image side of the optical imaging system along an optical axis: a first lens having a negative refractive power; a second lens having a refractive power, the image side surface of the second lens is a convex surface; a stop; a third lens having a refractive power; a fourth lens having a negative refractive power; a fifth lens having a refractive power; a sixth lens having a refractive power; and a seventh lens having a positive refractive power. A half of a maximal field-of-view Semi-FOV of the optical imaging system satisfies: Semi-FOV≥55°; and a distance TTL from an object side surface of the first lens to an imaging plane of the optical imaging system along the optical axis of the optical imaging system and a half of a diagonal length ImgH of an effective pixel area on an imaging plane of the optical imaging system satisfy: 3.0<TTL/ImgH<3.5.

20 Claims, 9 Drawing Sheets

(56) References Cited

U.S. PATENT DOCUMENTS

| | | | | |
|---|---|---|---|---|
| 2008/0144189 A1* | 6/2008 | Iwasawa | ............... | G02B 15/177 |
| | | | | 359/686 |
| 2020/0012078 A1* | 1/2020 | Kuo | ................... | G02B 13/0045 |
| 2020/0257092 A1 | 8/2020 | Zhang et al. | | |
| 2020/0301106 A1* | 9/2020 | Jung | .................... | G02B 13/002 |
| 2021/0255425 A1* | 8/2021 | Jiang | ................. | G02B 27/0025 |
| 2022/0050284 A1* | 2/2022 | Yamamoto | ............... | G02B 9/62 |

FOREIGN PATENT DOCUMENTS

| | | | | | |
|---|---|---|---|---|---|
| CN | 108717227 A | * | 10/2018 | ............. | G02B 1/041 |
| CN | 109445068 A | | 3/2019 | | |
| CN | 110244432 A | | 9/2019 | | |
| CN | 107728290 B | * | 11/2019 | ......... | G02B 13/0045 |
| CN | 210720847 U | * | 6/2020 | ......... | G02B 13/0015 |
| CN | 111856729 A | * | 10/2020 | | |
| CN | 111983788 A | | 11/2020 | | |
| CN | 112987259 A | * | 6/2021 | ......... | G02B 13/0045 |
| CN | 213544938 U | | 6/2021 | | |
| CN | 113608337 A | * | 11/2021 | | |
| CN | 110850557 B | * | 2/2022 | ......... | G02B 13/0045 |
| JP | 2014197130 A | * | 10/2014 | ............. | G02B 13/04 |
| JP | 2017102211 A | | 6/2017 | | |

\* cited by examiner

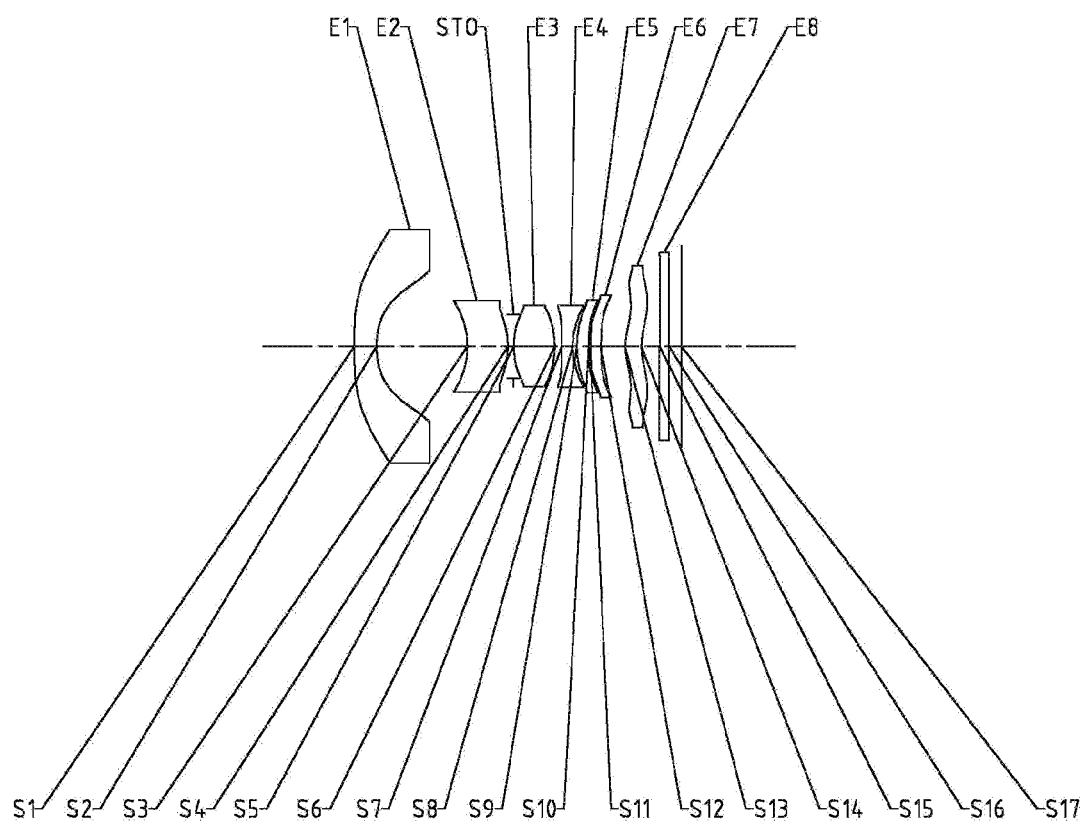
Fig. 1
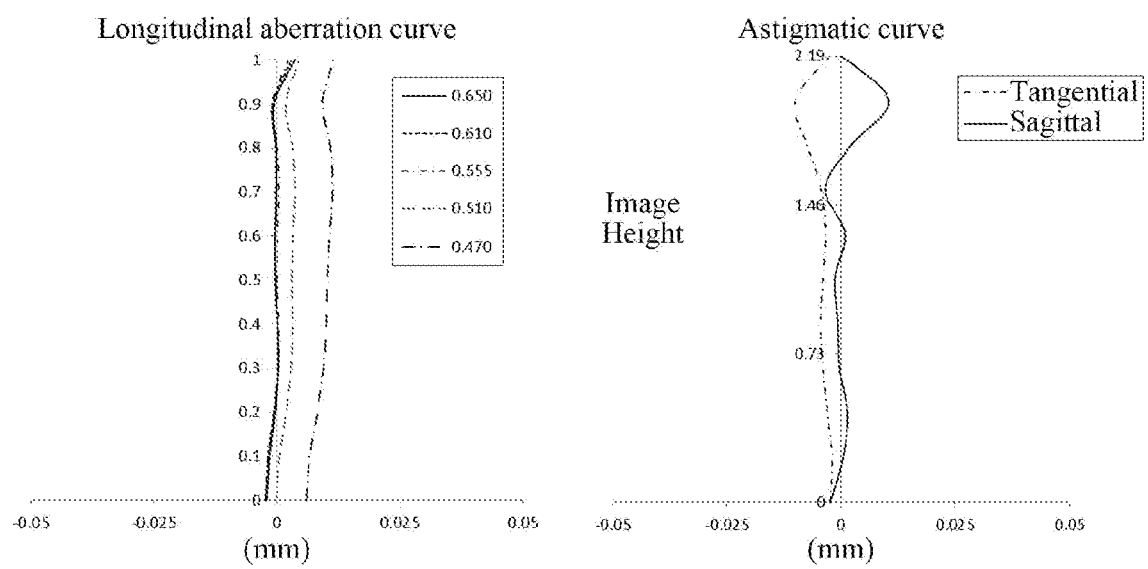
Fig. 2A                    Fig. 2B

OPTICAL IMAGING SYSTEM

CROSS-REFERENCE TO RELATED APPLICATIONS

This application claims the priority from Chinese Patent Application No. 202011494844.8, filed in the National Intellectual Property Administration (CNIPA) on Dec. 17, 2020, the contents of which are hereby incorporated by reference in their entirety.

TECHNICAL FIELD

The present disclosure relates to the field of optical elements, and particularly to an optical imaging system.

BACKGROUND

With the rapid development of electronic products, portable and wearable electronic products such as smart phones and smart watches are rapidly popularized. Users have higher and higher requirements for the imaging technology of portable electronic products such as smart phones, that is, more new requirements are put forward for imaging systems of portable electronic products such as smart phones. As such, electronic product suppliers spend a lot of time and effort on product innovation in order to improve the competitiveness of their products.

Since an optical imaging system with a large field-of-view can collect more object information during imaging, it has a higher resolution and a more satisfactory imaging effect. Therefore, the large field-of-view feature will become an inevitable trend of the development of optical imaging systems on portable electronic products.

SUMMARY

In an aspect, some embodiments of the present disclosure provide an optical imaging system that comprises, sequentially from an object side to an image side of the optical imaging system along an optical axis: a first lens having a negative refractive power; a second lens having a refractive power, an image-side surface of the second lens is convex surface; a stop; a third lens having a refractive power; a fourth lens having a negative refractive power; a fifth lens having a refractive power; a sixth lens having a refractive power; and a seventh lens having a positive refractive power. A half of a maximal field-of-view Semi-FOV of the optical imaging system may satisfy: Semi-FOV≥55°. A distance TTL from an object side surface of the first lens to an imaging plane of the optical imaging system along the optical axis of the optical imaging system and a half of a diagonal length ImgH of an effective pixel area on the imaging plane of the optical imaging system may satisfy: 3.0<TTL/ImgH<3.5.

In an embodiment, at least one of the surfaces from an object-side surface of the first lens to an image-side surface of the seventh lens is an aspheric surface.

In an embodiment, an effective focal length f5 of the fifth lens and an effective focal length f6 of the sixth lens may satisfy: −5.2<|f6/f5|<−2.4.

In an embodiment, an effective focal length f4 of the fourth lens and an effective focal length f7 of the seventh lens may satisfy: −7.5<f7/f4<−5.0.

In an embodiment, an effective focal length f1 of the first lens and an effective focal length f3 of the third lens may satisfy: −3.0<f1/f3<−2.0.

In an embodiment, a radius of curvature R1 of an object side surface of the first lens and an effective focal length f1 of the first lens may satisfy: −7.0≤R1/f1≤−4.5.

In an embodiment, a radius of curvature R10 of an image side surface of the fifth lens and a radius of curvature R11 of an object side surface of the sixth lens may satisfy: 2.4<|R10/R11|<6.5.

In an embodiment, a radius of curvature R6 of an image side surface of the third lens and a radius of curvature R13 of an object side surface of the seventh lens may satisfy: −3.0<R6/R13<−1.5.

In an embodiment, a radius of curvature R2 of an image side surface of the first lens, a radius of curvature R3 of an object side surface of the second lens and a radius of curvature R4 of an image side surface of the second lens may satisfy: −3.0<(R3+R4)/R2<−1.5.

In an embodiment, a central thickness CT1 of the first lens along the optical axis, a central thickness CT2 of the second lens along the optical axis and a spaced interval T12 between the first lens and the second lens along the optical axis may satisfy: 1.0<T12/(CT1+CT2)<2.0.

In an embodiment, a central thickness CT7 of the seventh lens along the optical axis and the radius of curvature R14 of the image side surface of the seventh lens may satisfy: 2.0<R14/CT7<4.0.

In an embodiment, a spaced interval T45 between the fourth lens and the fifth lens along the optical axis and a spaced interval T67 between the sixth lens and the seventh lens along the optical axis may satisfy: 3.5<T67/T45<5.5.

In an embodiment, a central thickness CT3 of the third lens along the optical axis and a central thickness CT4 of the fourth lens along the optical axis may satisfy: 2.0<CT3/CT4<4.0.

In another aspect, some embodiments of the present disclosure provide an optical imaging system that comprises, sequentially from an object side to an image side of the optical imaging system along an optical axis: a first lens having a negative refractive power; a second lens having a refractive power, an image-side surface of the second lens is a convex surface; a stop; a third lens having a refractive power; a fourth lens having a negative refractive power; a fifth lens having a refractive power; a sixth lens having a refractive power; and a seventh lens having a positive refractive power. A half of a maximal field-of-view Semi-FOV of the optical imaging system may satisfy: Semi-FOV≥55°; a spaced interval T45 between the fourth lens and the fifth lens along the optical axis and a spaced interval T67 between the sixth lens and the seventh lens along the optical axis may satisfy: 3.5<T67/T45<5.5.

In an embodiment, an effective focal length f5 of the fifth lens and an effective focal length f6 of the sixth lens may satisfy: −5.2<|f6/f5|<−2.4.

In an embodiment, an effective focal length f4 of the fourth lens and an effective focal length f7 of the seventh lens may satisfy: −7.5<f7/f4<−5.0.

In an embodiment, an effective focal length f1 of the first lens and an effective focal length f3 of the third lens may satisfy: −3.0<f1/f3<−2.0.

In an embodiment, a radius of curvature R1 of an object side surface of the first lens and an effective focal length f1 of the first lens may satisfy: −7.0≤R1/f1≤−4.5.

In an embodiment, a radius of curvature R10 of an image side surface of the fifth lens and a radius of curvature R11 of an object side surface of the sixth lens may satisfy: 2.4<|R10/R11|<6.5.

In an embodiment, a radius of curvature R6 of an image side surface of the third lens and a radius of curvature R13 of an object side surface of the seventh lens may satisfy: $-3.0 < R6/R13 < -1.5$.

In an embodiment, a radius of curvature R2 of an image side surface of the first lens, a radius of curvature R3 of an object side surface of the second lens and a radius of curvature R4 of an image side surface of the second lens may satisfy: $-3.0 < (R3+R4)/R2 < -1.5$.

In an embodiment, a central thickness CT1 of the first lens along the optical axis, a central thickness CT2 of the second lens along the optical axis and a spaced interval T12 between the first lens and the second lens along the optical axis may satisfy: $1.0 < T12/(CT1+CT2) < 2.0$.

In an embodiment, a central thickness CT7 of the seventh lens along the optical axis and the radius of curvature R14 of the image side surface of the seventh lens may satisfy: $2.0 < R14/CT7 < 4.0$.

In an embodiment, a central thickness CT3 of the third lens along the optical axis and a central thickness CT4 of the fourth lens along the optical axis may satisfy: $2.0 < CT3/CT4 < 4.0$.

In an embodiment, a distance TTL from an object side surface of the first lens to an imaging plane of the optical imaging system along the optical axis of the optical imaging system and a half of a diagonal length ImgH of an effective pixel area on the imaging plane of the optical imaging system may satisfy: $3.0 < TTL/ImgH < 3.5$.

Embodiments of the present disclosure provide an optical imaging system that is suitable for portable electronic products and has a large field of view, miniaturization and good imaging quality through reasonable distribution of optical power and optimization of optical parameters.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 shows a schematic structural diagram of an optical imaging system according to Example 1 of the present disclosure;

FIGS. 2A-2D respectively show a longitudinal aberration curve, an astigmatism curve, a distortion curve and a lateral color curve of the optical imaging system of Example 1;

DETAILED DESCRIPTION OF EMBODIMENTS

Figure 2C:
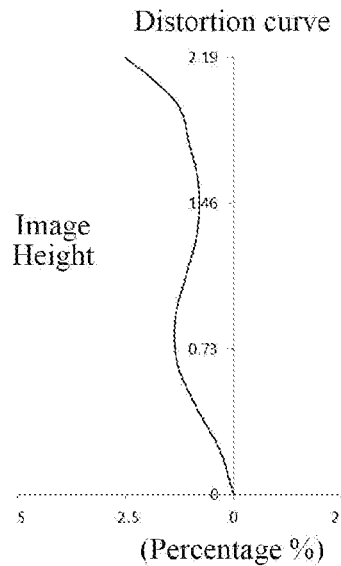

In order to better understand the present disclosure, various aspects of the present disclosure will be described in more detail with reference to the accompanying drawings. It should be understood that these detailed descriptions are only descriptions of exemplary embodiments of the present disclosure, and are not intended to limit the scope of the present disclosure in any way. Throughout the specification, the same reference numerals refer to the same elements. The expression "and/or" includes any and all combinations of one or more of the associated listed items.

It should be noted that, in the specification, the expressions such as "first," "second," and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In the description, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object side surface of the lens, and a surface of the each lens that is closest to an imaging plane is referred to as the image side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of" when preceding a list of listed features, modify the entire list of features rather than an individual element in the list. Further, the use of "may" when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that embodiments in the present disclosure and the features in the embodiments may be combined with each other on a non-conflict basis. Embodiments of the present disclosure will be described below in detail with reference to the accompanying drawings.

Features, principles and other aspects of the present disclosure will be described below in detail.

An optical imaging system according to exemplary embodiments of the present disclosure may include seven lenses with refractive powers, which are a first lens, a second lens, a third lens, a fourth lens, a fifth lens, a sixth lens and a seventh lens respectively. The seven lenses are arranged sequentially along an optical axis from an object side to an image side. Any two adjacent lenses among the first lens to the seventh lens may have a spaced interval between them.

In an exemplary embodiment, the first lens may have a negative refractive power; the second lens may have a positive refractive power or a negative refractive power, and the image side surface thereof may be convex; the third lens may have a positive refractive power or a negative refractive power; the fourth lens may have a negative refractive power; the fifth lens may have a positive refractive power or a negative refractive power; the sixth lens may have a positive refractive power or a negative refractive power; and the seventh lens may have a positive refractive power. By reasonably setting the optical powers and surface types of the lenses, the low-order aberration of the optical imaging system can be effectively balanced.

In an exemplary embodiment, the optical imaging system may satisfy: Semi-FOV≥55°, where Semi-FOV is half of the maximum field-of-view of the optical imaging system. By satisfying Semi-FOV≥55°, the imaging range of the optical imaging system may be efficiently controlled.

In an exemplary embodiment, the optical imaging system may satisfy: $-5.2<f6/f5<-2.4$, where f5 is the effective focal length of the fifth lens, and f6 is the effective focal length of the sixth lens. Satisfying $-5.2<f6/f5<-2.4$ is beneficial to control the optical powers of some lenses arranged in the rear part of the optical system in a small range, and can reduce the deflection angle of the light, thereby is beneficial to reduce the sensitivity of the system.

In an exemplary embodiment, the optical imaging system may satisfy: $-7.5<f7/f4<-5.0$, where f4 is the effective focal length of the fourth lens, and f7 is the effective focal length of the seventh lens. More particularly, f7 and f4 may further satisfy: $-7.2<f7/f4<-5.2$. Satisfying $-7.5<f7/f4<-5.0$ may effectively correct the distortion at the paraxial area of the imaging plane, which is beneficial to improve the imaging quality of the system.

In an exemplary embodiment, the optical imaging system may satisfy: $-3.0<f1/f3<-2.0$, where f1 is the effective focal length of the first lens, and f3 is the effective focal length of the third lens. More particularly, f1 and f3 may further satisfy: $-2.7<f1/f3<-2.0$. Satisfying $-3.0<f1/f3<-2.0$ may distribute the focal length of each lens reasonably, and may also balance the field curvature of the system.

In an exemplary embodiment, the optical imaging system may satisfy: $-7.0≤R1/f1≤-4.5$, where R1 is the radius of curvature of the object side surface of the first lens, and f1 is the effective focal length of the first lens. More particularly, R1 and f1 may further satisfy: $-7.0≤R1/f1≤-4.5$. Satisfying $-7.0≤R1/f1≤-4.5$ may make the optical imaging system have a better ability to balance astigmatism.

In an exemplary embodiment, the optical imaging system may satisfy: $2.4<|R10/R11|<6.5$, where R10 is the radius of curvature of the image side surface of the fifth lens, and R11 is the radius of curvature of the object side surface of the sixth lens. More particularly, R10 and R11 may further satisfy: $2.4<|R10/R11|<6.2$. Satisfying $2.4≤|R10/R11|≤6.5$ may effectively eliminate the spherical aberration of the system and be beneficial to obtain high-definition images.

In an exemplary embodiment, the optical imaging system may satisfy: $-3.0<R6/R13<-1.5$, where R6 is the radius of curvature of the image side surface of the third lens, and R13 is the radius of curvature of the object side surface of the seventh lens. More particularly, R6 and R13 may further satisfy: $-2.4<R6/R13<-1.5$. Satisfying $-3.0<R6/R13<-1.5$ is beneficial to reasonable control of light deflection angle, so that the system can be better matched to commonly used chips.

In an exemplary embodiment, the optical imaging system may satisfy: $-3.0<(R3+R4)/R2<-1.5$, where R2 is the radius of curvature of the image side surface of the first lens, R3 is the radius of curvature of the object side surface of the second lens, and R4 is the radius of curvature of the image side surface of the second lens. More particularly, R3, R4, and R2 may further satisfy: $-2.8<(R3+R4)/R2<-1.8$. Satisfying $-3.0<(R3+R4)/R2<-1.5$ may make the optical imaging system have a larger aperture to improve the overall brightness of the imaging.

In an exemplary embodiment, the optical imaging system may satisfy: $1.0<T12/(CT1+CT2)<2.0$, where CT1 is the central thickness of the first lens along the optical axis, CT2 is the center thickness of the second lens along the optical axis, and T12 is the spaced interval between the first lens and the second lens along the optical axis. More particularly, T12, CT1 and CT2 may further satisfy: $1.4<T12/(CT1+CT2)<1.7$. Satisfying $1.0<T12/(CT1+CT2)<2.0$ may effectively control the distortion at the edge field-of-view of the imaging system, which is beneficial to control the amount of distortion at the edge field-of-view within a reasonable range.

In an exemplary embodiment, the optical imaging system may satisfy: $2.0<R14/CT7<4.0$, where CT7 is the central thickness of the seventh lens along the optical axis, and R14 is the radius of curvature of the image side surface of the seventh lens. More particularly, R14 and CT7 may further satisfy: $2.4<R14/CT7<3.7$. Satisfying $2.0<R14/CT7<4.0$ may effectively control the incident angle of light on the seventh lens, and improve the imaging quality of the optical imaging system.

In an exemplary embodiment, the optical imaging system may satisfy: $3.5<T67/T45<5.5$, where T45 is the spaced interval between the fourth lens and the fifth lens along the optical axis, and T67 is the spaced interval between the sixth lens and the seventh lens along the optical axis. More particularly, T67 and T45 may further satisfy: $3.6<T67/T45<5.5$. Satisfying $3.5<T67/T45<5.5$ may realize the machinability and process requirements of the system while ensuring the compactness of the optical imaging system.

In an exemplary embodiment, the optical imaging system may satisfy: $2.0<CT3/CT4<4.0$, where CT3 is the central thickness of the third lens along the optical axis, and CT4 is the central thickness of the fourth lens along the optical axis. More particularly, CT3 and CT4 may further satisfy:

2.2<CT3/CT4<4.0. Satisfying 2.0<CT3/CT4<4.0 will help to evenly distribute the sizes of the lenses, ensure assembly stability, and help to reduce the overall aberration of the optical imaging system.

In an exemplary embodiment, the optical imaging system may satisfy: 3.0<TTL/ImgH<3.5, where TTL is the distance from the object side of the first lens to the imaging plane of the optical imaging system along the optical axis, ImgH is half of the diagonal length of the effective pixel area on the imaging plane of the optical imaging system. More particularly, TTL and ImgH may further satisfy: 3.0<TTL/ImgH<3.4. Satisfying 3.0<TTL/ImgH<3.5 may effectively control the total size of the optical imaging system, and meet the stability of assembly.

In an exemplary embodiment, the optical imaging system further includes a stop provided between the second lens and the third lens. Optionally, the above-mentioned optical imaging system may further include a filter for correcting color deviation and/or a protective glass for protecting the photosensitive element located on the imaging surface. Embodiments of the present disclosure propose an optical imaging system with features such as miniaturization, high resolution, large field-of-view, ultra-thinness, and high imaging quality. The optical imaging system according to the above-mentioned embodiments of the present disclosure may employ multiple lenses, such as the above seven lenses. By reasonably distributing the refractive powers, surface types, center thicknesses of the lenses, and on-axis distances between the lenses, it can effectively converge the incident light, reduce the total optical length of the imaging system, and improve the workability of the imaging lens, making the optical imaging system more conducive to production and processing.

In an exemplary embodiment of the present disclosure, at least one of the surfaces of lenses is aspheric, that is, at least one of the object side surface of the first lens to the image side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better radius of curvature characteristic, and has the advantages of improving distortion aberration and improving astigmatic aberration. With aspheric lens, the aberrations that occur during imaging may be eliminated as much as possible, and thus improving the image quality. Optionally, at least one of the object side surface and the image side surface of each of the first lens, the second lens, the third lens, the fourth lens, the fifth lens, the sixth lens and the seventh lens is aspheric. Optionally, both the object side surface and the image side surface of at least one of the first lens, the second lens, the third lens, the fourth lens, the fifth lens, the sixth lens and the seventh lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking seven lenses as an example, the optical imaging system is not limited to include seven lenses. The optical imaging system may also include other numbers of lenses if desired.

Some examples of the optical imaging system applicable to the above embodiments will be further described below with reference to the accompanying drawings.

Example 1

An optical imaging system according to example 1 of the present disclosure is described below with reference to FIG. 1 to FIG. 2D. FIG. 1 shows a schematic structural view of the optical imaging system according to example 1 of the present disclosure.

As shown in FIG. 1, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has a negative refractive power, an object side surface S1 of the first lens is a convex surface, and an image side surface S2 of the first lens is a concave surface. The second lens E2 has a positive refractive power, an object side surface S3 of the second lens is a concave surface, and an image side surface S4 of the second lens is a convex surface. The third lens E3 has a positive refractive power, an object side surface S5 of the third lens is a convex surface, and an image side surface S6 of the third lens is a convex surface. The fourth lens E4 has a negative refractive power, an object side surface S7 of the fourth lens is a convex surface, and an image side surface S8 of the fourth lens is a concave surface. The fifth lens E5 has a positive refractive power, an object side surface S9 of the fifth lens is a convex surface, and an image side surface S10 of the fifth lens is a convex surface. The sixth lens E6 has a negative refractive power, an object side surface S11 of the sixth lens is a convex surface, and an image side surface S12 of the sixth lens is a concave surface. The seventh lens E7 has a positive refractive power, an object side surface S13 of the seventh lens is a convex surface, and an image side surface S14 of the seventh lens is a concave surface. The optical filter E8 has an object side surface S15 and an image side surface S16. Light from an object sequentially passes through the respective surfaces S1 to S16 and is finally imaged on the imaging plane S17.

Table 1 is a table illustrating basic parameters of the optical imaging system of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 25.8257 | 0.4885 | 1.55 | 56.1 | −3.96 | −99.0000 |
| S2 | Aspheric | 1.9817 | 2.0048 | | | | −0.7036 |
| S3 | Aspheric | −2.0460 | 0.8917 | 1.55 | 56.1 | 10.82 | 0.9288 |

TABLE 1-continued

| Surface number | Surface type | Radius of curvature | Thickness/ Distance | Refractive index | Abbe number | Focal length | Conic coefficient |
|---|---|---|---|---|---|---|---|
| S4 | Aspheric | −1.7535 | 0.1277 | | | | 0.7655 |
| STO | Spherical | Infinite | 0.0010 | | | | |
| S5 | Aspheric | 1.7728 | 0.9044 | 1.55 | 56.1 | 1.83 | −0.7842 |
| S6 | Aspheric | −1.8793 | 0.1528 | | | | 0.7503 |
| S7 | Aspheric | 17.9082 | 0.2350 | 1.68 | 19.2 | −2.05 | −99.0000 |
| S8 | Aspheric | 1.2843 | 0.0979 | | | | 0.0729 |
| S9 | Aspheric | 2.6820 | 0.2605 | 1.57 | 37.3 | 4.19 | −12.8225 |
| S10 | Aspheric | −21.0321 | 0.0363 | | | | 93.3356 |
| S11 | Aspheric | 8.4475 | 0.2350 | 1.54 | 55.8 | −10.32 | −30.6035 |
| S12 | Aspheric | 3.3137 | 0.5364 | | | | −99.0000 |
| S13 | Aspheric | 1.2113 | 0.3531 | 1.54 | 55.8 | 14.59 | −1.1761 |
| S14 | Aspheric | 1.2870 | 0.3994 | | | | −4.2323 |
| S15 | Spherical | Infinite | 0.2100 | 1.52 | 64.2 | | |
| S16 | Spherical | Infinite | 0.2756 | | | | |
| S17 | Spherical | Infinite | | | | | |

In this example, a total effective focal length f of the optical imaging system satisfies f=1.53 mm, a total length TTL (that is, a distance from the object side surface S1 of the first lens E1 to the imaging plane S17 along the optical axis) of the optical imaging system satisfies TTL=7.21 mm, half of a diagonal length ImgH of an effective pixel area on the imaging plane S17 of the optical imaging system satisfies ImgH=2.19 mm, and half of a maximal field-of-view Semi-FOV of the optical imaging system satisfies Semi-FOV=55.7°, and the aperture value Fno of the optical imaging system satisfies Fno=2.20.

In example 1, both the object side surface and the image side surface of any one of the first lens E1 to the seventh lens E7 are aspheric. The surface type x of each aspheric lens may be defined by using, but not limited to, the following aspheric formula:

$$x = \frac{ch^2}{1 + \sqrt{1 - (k+1)c^2 h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients $A_4$, $A_6$, $A_8$, $A_{10}$, $A_{12}$, $A_{14}$, $A_{16}$, $A_{18}$ and $A_{20}$ applicable to each aspheric surface S1 to S14 in example 1.

TABLE 2

| Surface number | $A_4$ | $A_6$ | $A_8$ | $A_{10}$ | $A_{12}$ |
|---|---|---|---|---|---|
| S1 | 7.9193E−01 | −1.6093E−01 | 3.3396E−02 | −7.8611E−03 | 2.3027E−03 |
| S2 | 5.3098E−01 | −7.2800E−02 | −2.5109E−02 | −6.5592E−03 | 9.4276E−04 |
| S3 | −2.4251E−02 | 7.7256E−03 | 6.6513E−04 | 1.0064E−04 | 1.0047E−05 |
| S4 | 3.8848E−02 | 2.9211E−03 | 4.1463E−04 | 6.3355E−05 | 2.8228E−05 |
| S5 | 1.7274E−02 | −9.8323E−04 | −1.4081E−04 | −8.3461E−06 | 1.9941E−05 |
| S6 | 1.5209E−02 | −5.9623E−04 | −4.9593E−04 | −2.4066E−04 | 1.3098E−04 |
| S7 | −9.3655E−02 | 6.2274E−03 | −1.3881E−03 | −5.9104E−04 | 7.0717E−06 |
| S8 | −1.2776E−01 | 1.0637E−02 | −1.2046E−04 | −7.9138E−04 | 5.5578E−05 |
| S9 | 1.0281E−01 | −1.7763E−02 | 1.8631E−03 | −1.8720E−03 | 4.7931E−04 |
| S10 | 2.6560E−01 | −4.9440E−02 | 8.4547E−03 | −4.1867E−03 | 1.8240E−03 |
| S11 | 1.8498E−01 | −3.5803E−02 | 2.0817E−03 | −1.6598E−03 | 8.4838E−04 |
| S12 | 1.3302E−01 | 5.4409E−03 | −1.3507E−03 | 3.2568E−03 | −3.9875E−04 |
| S13 | −1.1832E+00 | 2.9992E−01 | −5.1350E−02 | 4.0536E−03 | −3.1418E−03 |
| S14 | −7.8916E−01 | 1.7711E−01 | −2.1791E−02 | 8.4880E−03 | −5.0512E−03 |

| Surface number | $A_{14}$ | $A_{16}$ | $A_{18}$ | $A_{20}$ |
|---|---|---|---|---|
| S1 | −8.3507E−04 | 2.4904E−04 | 1.1235E−05 | 6.9216E−05 |
| S2 | 1.3872E−03 | 6.0692E−04 | 8.4683E−05 | −3.0864E−05 |
| S3 | −5.1264E−06 | −1.7765E−06 | −1.9235E−06 | 1.2764E−06 |
| S4 | 6.6872E−07 | 3.2203E−06 | −2.4914E−06 | 3.4591E−07 |
| S5 | 1.3713E−05 | 4.0101E−06 | 2.5276E−07 | 0.0000E+00 |
| S6 | 5.9674E−05 | 4.2386E−05 | 3.2367E−06 | 0.0000E+00 |
| S7 | −2.1958E−05 | 2.5026E−05 | 2.8565E−06 | 0.0000E+00 |
| S8 | −1.1780E−04 | 3.6735E−05 | −2.7839E−06 | 0.0000E+00 |
| S9 | −3.0304E−04 | 7.1010E−05 | −1.0475E−05 | 0.0000E+00 |
| S10 | −7.5457E−04 | 2.9275E−04 | −6.2163E−05 | 0.0000E+00 |
| S11 | −4.6958E−04 | 1.8005E−04 | −5.2158E−05 | 0.0000E+00 |

TABLE 2-continued

| | | | | |
|---|---|---|---|---|
| S12 | 1.5560E−04 | −1.2761E−04 | 4.6276E−05 | 6.7503E−06 |
| S13 | 2.3971E−03 | −8.8902E−04 | 3.9932E−05 | 0.0000E+00 |
| S14 | 8.1760E−04 | −7.4684E−04 | 2.5439E−05 | −8.8344E−05 |

Figure 2D:
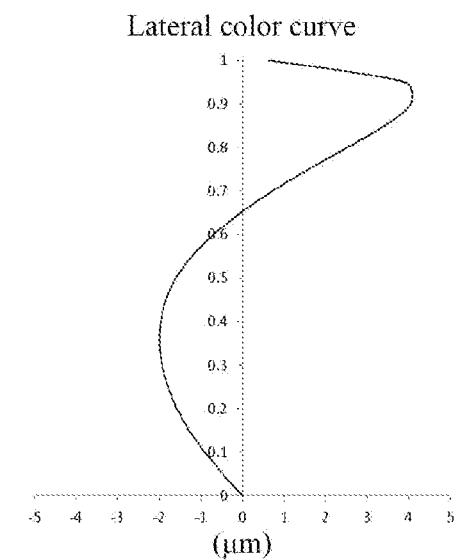

FIG. 2A shows a longitudinal aberration curve of the optical imaging system according to example 1, representing deviations of focal points converged by light of different wavelengths after passing through the lens assembly. FIG. 2B shows an astigmatic curve of the optical imaging system according to example 1, representing a curvature of a tangential plane and a curvature of a sagittal plane. FIG. 2C shows a distortion curve of the optical imaging system according to example 1, representing amounts of distortion corresponding to different image heights. FIG. 2D shows a lateral color curve of the optical imaging system according to example 1, representing deviations of different image heights on an imaging plane after light passes through the lens assembly. It can be seen from FIG. 2A to FIG. 2D that the optical imaging system provided in example 1 can achieve good image quality.

Example 2

Figure 3:
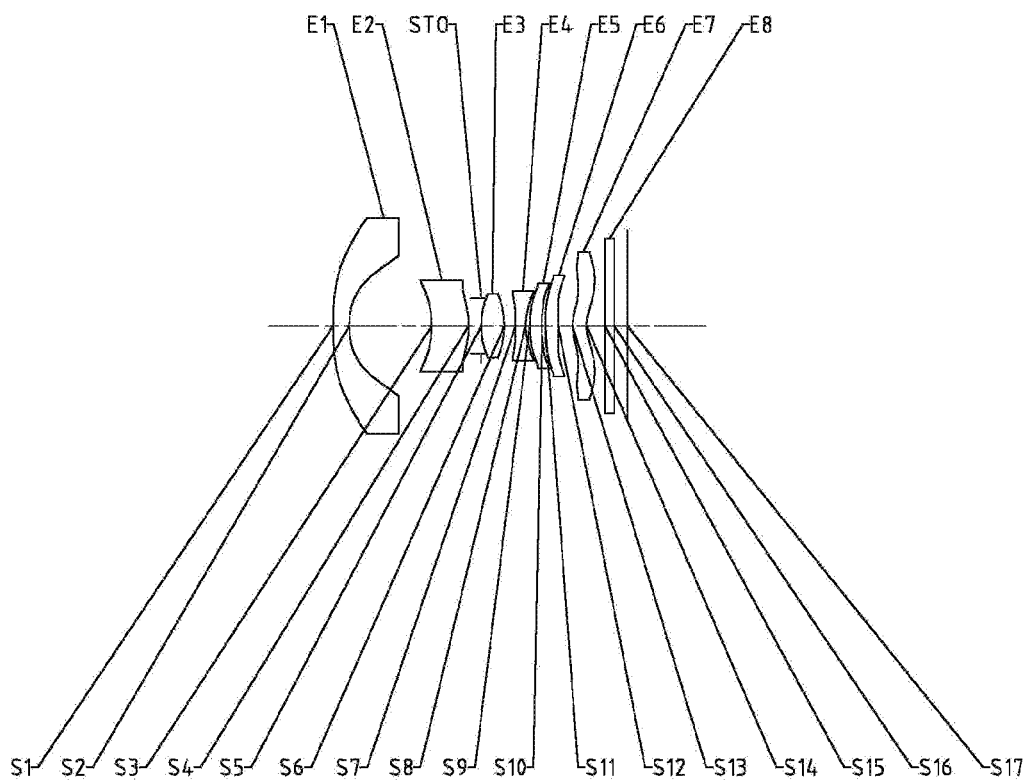
FIG. 3 shows a schematic structural diagram of an optical imaging system according to Example 2 of the present disclosure.

An optical imaging system according to Example 2 of the present disclosure is described below with reference to FIG. 3 to FIG. 4D. In this example and the following examples, for the sake of brevity, some descriptions similar to those in Example 1 will be omitted. FIG. 3 shows a schematic structural view of the optical imaging system according to Example 2 of the present disclosure.

As shown in FIG. 3, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has a negative refractive power, an object side surface S1 of the first lens is a convex surface, and an image side surface S2 of the first lens is a concave surface. The second lens E2 has a positive refractive power, an object side surface S3 of the second lens is a concave surface, and an image side surface S4 of the second lens is a convex surface. The third lens E3 has a positive refractive power, an object side surface S5 of the third lens is a convex surface, and an image side surface S6 of the third lens is a convex surface. The fourth lens E4 has a negative refractive power, an object side surface S7 of the fourth lens is a convex surface, and an image side surface S8 of the fourth lens is a concave surface. The fifth lens E5 has a positive refractive power, an object side surface S9 of the fifth lens is a convex surface, and an image side surface S10 of the fifth lens is a convex surface. The sixth lens E6 has a negative refractive power, an object side surface S11 of the sixth lens is a concave surface, and an image side surface S12 of the sixth lens is a convex surface. The seventh lens E7 has a positive refractive power, an object side surface S13 of the seventh lens is a convex surface, and an image side surface S14 of the seventh lens is a concave surface. The optical filter E8 has an object side surface S15 and an image side surface S16. Light from an object sequentially passes through the respective surfaces S1 to S16 and is finally imaged on the imaging plane S17.

In this example, a total effective focal length f of the optical imaging system satisfies f=1.47 mm, a total length TTL of the optical imaging system satisfies TTL=6.82 mm, half of a diagonal length ImgH of an effective pixel area on the imaging plane S17 of the optical imaging system satisfies ImgH=2.21 mm, and half of a maximal field-of-view Semi-FOV of the optical imaging system satisfies Semi-FOV=57.0°, and the aperture value Fno of the optical imaging system satisfies Fno=2.20.

Table 3 is a table showing basic parameters of the optical imaging system of example 2, wherein the units for the radius of curvature, the thickness/distance and the focal length are millimeter (mm). Table 4 shows the higher-order coefficients that can be used for each aspheric surface in Example 2, where each aspheric surface type can be defined by the formula (1) given in Example 1 above.

TABLE 3

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| S1 | Aspheric | 21.9562 | 0.3685 | 1.55 | 56.1 | −3.88 | −63.1766 |
| S2 | Aspheric | 1.9218 | 1.9161 | | | | −0.7266 |
| S3 | Aspheric | −2.6299 | 0.8560 | 1.55 | 56.1 | 10.33 | 1.4200 |
| S4 | Aspheric | −1.9998 | 0.2900 | | | | 0.3918 |
| STO | Spherical | Infinite | 0.0010 | | | | |
| S5 | Aspheric | 1.7895 | 0.5378 | 1.55 | 56.1 | 1.86 | −1.1186 |
| S6 | Aspheric | −2.1090 | 0.2588 | | | | 2.5592 |
| S7 | Aspheric | 17.1328 | 0.2350 | 1.68 | 19.2 | −2.25 | −99.0000 |
| S8 | Aspheric | 1.3925 | 0.0911 | | | | 0.2908 |
| S9 | Aspheric | 2.8190 | 0.2911 | 1.57 | 37.3 | 4.76 | −16.9829 |
| S10 | Aspheric | −70.7064 | 0.0736 | | | | 99.0000 |
| S11 | Aspheric | −11.4987 | 0.2990 | 1.54 | 55.8 | −24.13 | 23.6204 |
| S12 | Aspheric | −103.3656 | 0.3322 | | | | −99.0000 |
| S13 | Aspheric | 0.9211 | 0.3228 | 1.54 | 55.8 | 14.89 | −1.2221 |
| S14 | Aspheric | 0.9136 | 0.4304 | | | | −2.5119 |
| S15 | Spherical | Infinite | 0.2100 | 1.52 | 64.2 | | |
| S16 | Spherical | Infinite | 0.3066 | | | | |
| S17 | Spherical | Infinite | | | | | |

TABLE 4

| Surface number | $A_4$ | $A_6$ | $A_8$ | $A_{10}$ | $A_{12}$ |
|---|---|---|---|---|---|
| S1 | 7.7876E−01 | −1.5388E−01 | 3.6469E−02 | −8.4809E−03 | 5.7347E−03 |
| S2 | 5.1533E−01 | −6.4463E−02 | −1.9466E−02 | −5.4444E−03 | 3.4185E−03 |
| S3 | −4.0133E−02 | 1.4779E−02 | 7.4375E−04 | −5.7656E−05 | −7.5528E−05 |
| S4 | 4.2900E−02 | 6.9954E−03 | 1.2637E−03 | 4.1893E−04 | 1.2745E−04 |
| S5 | 6.9090E−03 | 4.2143E−04 | 3.1911E−05 | 7.6017E−05 | 5.9748E−06 |
| S6 | −1.1371E−02 | 5.5501E−03 | −1.5989E−04 | 1.6801E−04 | −2.3953E−06 |
| S7 | −9.4552E−02 | 1.5672E−02 | −1.3829E−03 | 3.3846E−04 | −1.6975E−04 |
| S8 | −9.2631E−02 | 1.2709E−02 | −1.0046E−03 | 8.3234E−04 | −2.0213E−04 |
| S9 | 9.0644E−02 | −1.0966E−02 | −6.7565E−04 | −1.8621E−03 | 2.2795E−04 |
| S10 | 2.0737E−01 | −2.8490E−02 | 7.5417E−03 | −8.6443E−03 | 2.6235E−03 |
| S11 | 2.8205E−01 | −6.2855E−02 | 2.0802E−02 | −5.1173E−03 | 1.8588E−03 |
| S12 | 1.6520E−01 | −3.7770E−03 | −1.4359E−02 | 9.7813E−03 | −2.0377E−03 |
| S13 | −1.3217E+00 | 3.2798E−01 | −7.2870E−02 | 1.4433E−02 | −3.9333E−03 |
| S14 | −1.0052E+00 | 2.0080E−01 | −4.2499E−02 | 1.6090E−02 | −3.2654E−03 |

| Surface number | $A_{14}$ | $A_{16}$ | $A_{18}$ | $A_{20}$ |
|---|---|---|---|---|
| S1 | −1.3461E−03 | 3.1361E−04 | −4.6522E−05 | −2.6417E−05 |
| S2 | 2.4381E−03 | 3.7455E−04 | −1.5569E−04 | −7.3721E−05 |
| S3 | 4.6738E−06 | −1.0907E−06 | 4.1959E−06 | −2.3859E−07 |
| S4 | 4.3713E−05 | 1.9137E−05 | 7.3250E−06 | 1.5317E−06 |
| S5 | 1.5311E−05 | 5.3580E−06 | 3.8342E−06 | 0.0000E+00 |
| S6 | 1.0626E−05 | 1.0848E−05 | 6.8685E−07 | 0.0000E+00 |
| S7 | 2.2155E−05 | 7.2527E−06 | 1.5603E−06 | 0.0000E+00 |
| S8 | 5.1511E−06 | −2.6015E−06 | 1.3535E−06 | 0.0000E+00 |
| S9 | −1.9796E−04 | 8.6078E−06 | −6.0569E−06 | 0.0000E+00 |
| S10 | −5.3790E−05 | −3.5020E−05 | −2.8192E−05 | 0.0000E+00 |
| S11 | −6.1562E−04 | −6.7422E−05 | 7.0798E−05 | 0.0000E+00 |
| S12 | 4.5804E−04 | −1.1464E−04 | 6.5524E−05 | −3.3015E−05 |
| S13 | 1.1392E−03 | −3.0932E−05 | 9.9684E−05 | 0.0000E+00 |
| S14 | −1.6884E−04 | −4.0743E−04 | −1.9668E−04 | 1.0840E−04 |

Figure 4A:
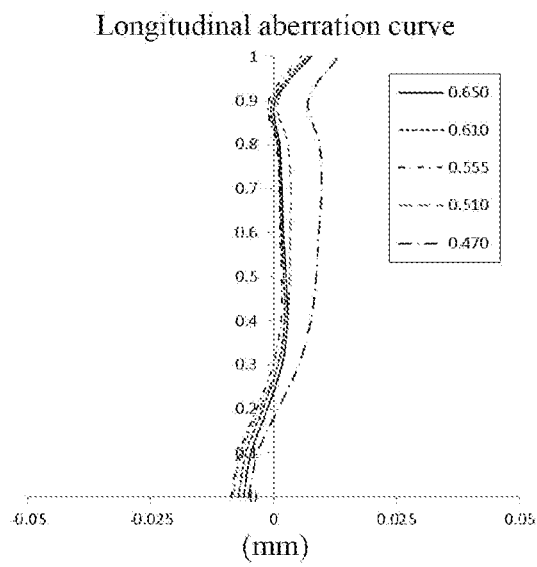
FIGS. 4A-4D respectively show a longitudinal aberration curve, an astigmatism curve, a distortion curve and a lateral color curve of the optical imaging system of Example 2.
Figure 4B:
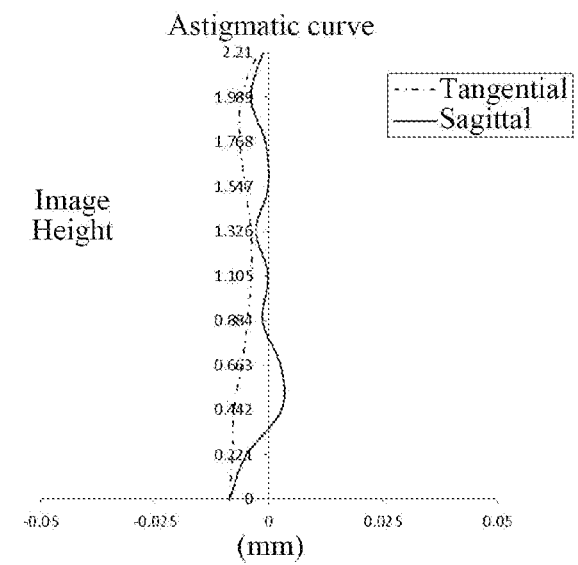
Figure 4C:
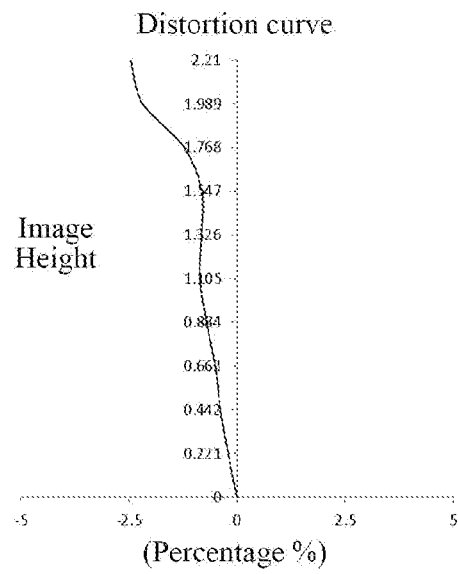
Figure 4D:
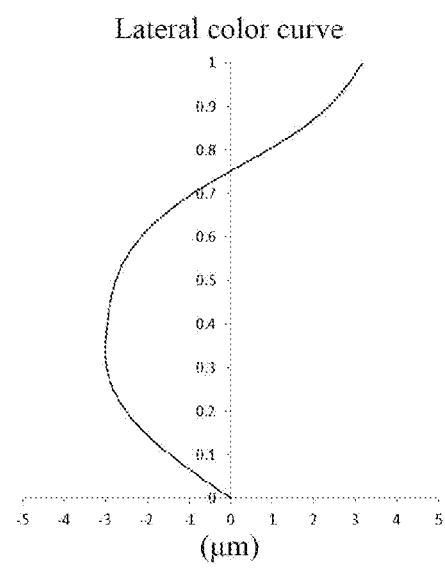

FIG. 4A shows a longitudinal aberration curve of the optical imaging system according to example 2, representing deviations of focal points converged by light of different wavelengths after passing through the lens assembly. FIG. 4B shows an astigmatic curve of the optical imaging system according to example 2, representing a curvature of a tangential plane and a curvature of a sagittal plane. FIG. 4C shows a distortion curve of the optical imaging system according to example 2, representing amounts of distortion corresponding to different image heights. FIG. 4D shows a lateral color curve of the optical imaging system according to example 2, representing deviations of different image heights on an imaging plane after light passes through the lens assembly. It can be seen from FIG. 4A to FIG. 4D that the optical imaging system provided in example 2 can achieve good image quality.

Example 3

Figure 5:
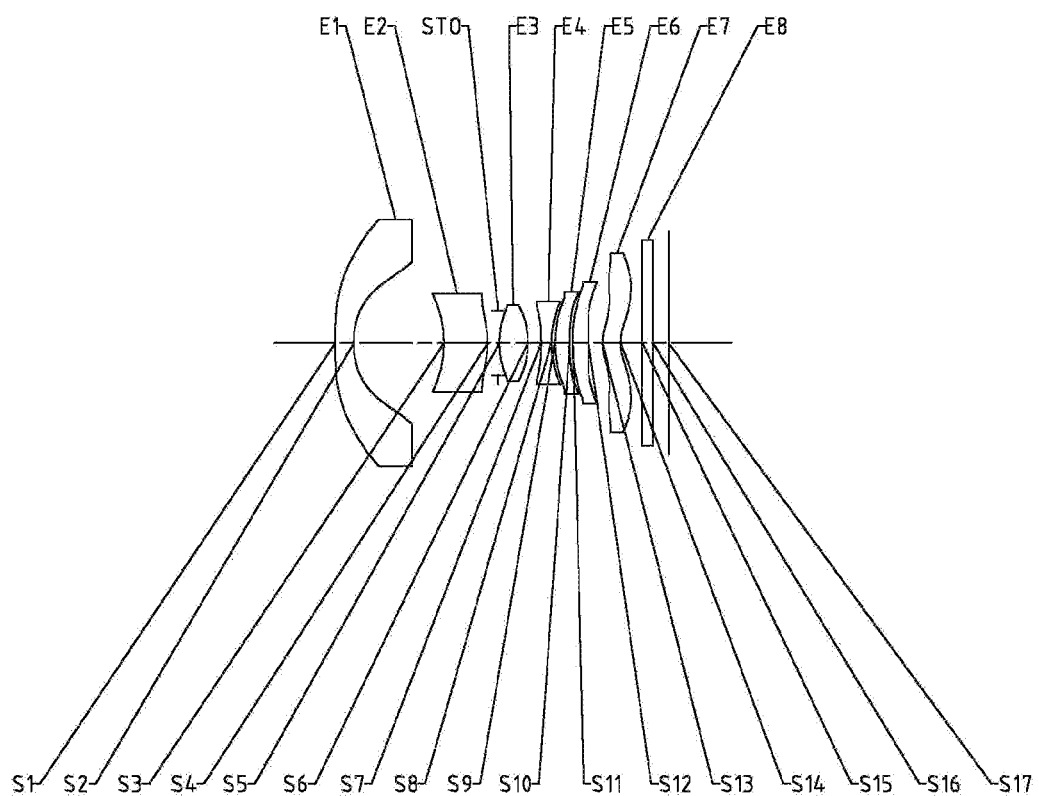
FIG. 5 shows a schematic structural diagram of an optical imaging system according to Example 3 of the present disclosure.

An optical imaging system according to example 3 of the present disclosure is described below with reference to FIG. 5 to FIG. 6D. FIG. 5 shows a schematic structural view of the optical imaging system according to example 3 of the present disclosure.

As shown in FIG. 5, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has a negative refractive power, an object side surface S1 of the first lens is a convex surface, and an image side surface S2 of the first lens is a concave surface. The second lens E2 has a positive refractive power, an object side surface S3 of the second lens is a concave surface, and an image side surface S4 of the second lens is a convex surface. The third lens E3 has a positive refractive power, an object side surface S5 of the third lens is a convex surface, and an image side surface S6 of the third lens is a convex surface. The fourth lens E4 has a negative refractive power, an object side surface S7 of the fourth lens is a concave surface, and an image side surface S8 of the fourth lens is a concave surface. The fifth lens E5 has a positive refractive power, an object side surface S9 of the fifth lens is a convex surface, and an image side surface S10 of the fifth lens is a convex surface. The sixth lens E6 has a negative refractive power, an object side surface S11 of the sixth lens is a concave surface, and an image side surface S12 of the sixth lens is a concave surface. The seventh lens E7 has a positive refractive power, an object side surface S13 of the seventh lens is a convex surface, and an image side surface S14 of the seventh lens is a concave surface. The optical filter E8 has an object side surface S15 and an image side surface S16. Light from an object sequentially passes through the respective surfaces S1 to S16 and is finally imaged on the imaging plane S17.

In this example, a total effective focal length f of the optical imaging system satisfies f=1.68 mm, a total length TTL of the optical imaging system satisfies TTL=7.68 mm, half of a diagonal length ImgH of an effective pixel area on the imaging plane S17 of the optical imaging system satisfies ImgH=2.56 mm, and half of a maximal field-of-view Semi-FOV of the optical imaging system satisfies Semi-FOV=57.3°, and the aperture value Fno of the optical imaging system satisfies Fno=2.20.

Table 5 is a table showing basic parameters of the optical imaging system of example 3, wherein the units for the radius of curvature, the thickness/distance and the focal length are millimeter (mm). Table 6 shows the higher-order coefficients that can be used for each aspheric surface in Example 3, where each aspheric surface type can be defined by the formula (1) given in Example 1 above.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 30.6389 | 0.4200 | 1.55 | 56.1 | −4.42 | 58.7640 |
| S2 | Aspheric | 2.2272 | 2.0775 | | | | −0.6946 |
| S3 | Aspheric | −3.2103 | 1.0080 | 1.55 | 56.1 | 14.01 | 1.6663 |
| S4 | Aspheric | −2.5117 | 0.2442 | | | | 0.0194 |
| STO | Spherical | Infinite | 0.0300 | | | | |
| S5 | Aspheric | 1.9977 | 0.6575 | 1.55 | 56.1 | 2.09 | −1.6795 |
| S6 | Aspheric | −2.3388 | 0.3055 | | | | 3.0122 |
| S7 | Aspheric | −387.4546 | 0.2350 | 1.68 | 19.2 | −2.52 | −99.0000 |
| S8 | Aspheric | 1.7182 | 0.0828 | | | | 0.4096 |
| S9 | Aspheric | 3.1494 | 0.3444 | 1.57 | 37.3 | 5.26 | −18.2083 |
| S10 | Aspheric | −61.6547 | 0.0720 | | | | 99.0000 |
| S11 | Aspheric | −12.9711 | 0.3548 | 1.54 | 55.8 | −24.04 | 52.7625 |
| S12 | Aspheric | 2500.0000 | 0.3252 | | | | −99.0000 |
| S13 | Aspheric | 1.0322 | 0.4163 | 1.54 | 55.8 | 13.75 | −1.1958 |
| S14 | Aspheric | 1.0309 | 0.5034 | | | | −2.0378 |
| S15 | Spherical | Infinite | 0.2436 | 1.52 | 64.2 | | |
| S16 | Spherical | Infinite | 0.3597 | | | | |
| S17 | Spherical | Infinite | | | | | |

TABLE 6

| Surface number | $A_4$ | $A_6$ | $A_8$ | $A_{10}$ | $A_{12}$ |
|---|---|---|---|---|---|
| S1 | 9.5816E−01 | −1.7583E−01 | 4.4661E−02 | −6.5086E−03 | 5.3282E−03 |
| S2 | 6.1554E−01 | −8.7255E−02 | −2.8343E−02 | −4.3861E−03 | 4.2951E−03 |
| S3 | −5.7141E−02 | 3.8910E−02 | −5.2754E−02 | 9.2808E−02 | −9.0594E−02 |
| S4 | 2.9767E−02 | 5.3771E−03 | 7.3170E−03 | 2.3263E−04 | 6.4947E−05 |
| S5 | 5.9605E−03 | 3.9195E−04 | −4.1229E−05 | 6.5928E−05 | −2.8578E−07 |
| S6 | −2.1354E−02 | 7.9231E−03 | −3.8227E−04 | 1.9186E−04 | −7.9391E−06 |
| S7 | −1.2388E−01 | 2.4504E−02 | −3.1543E−03 | 6.4477E−04 | −1.5313E−04 |
| S8 | −1.0988E−01 | 1.9850E−02 | −2.5537E−03 | 1.2456E−03 | −2.3411E−04 |
| S9 | 1.0189E−01 | −1.3868E−02 | −4.2685E−04 | −2.2917E−03 | 1.4476E−04 |
| S10 | 2.3480E−01 | −3.2157E−02 | 8.6110E−03 | −1.0824E−02 | 3.2530E−03 |
| S11 | 3.4607E−01 | −8.0258E−02 | 2.9137E−02 | −7.9952E−03 | 2.7232E−03 |
| S12 | −2.2829E−01 | 9.4868E−01 | −1.5601E+00 | 1.9160E+00 | −1.8404E+00 |
| S13 | −1.6467E+00 | 4.2835E−01 | −1.0793E−01 | 2.1153E−02 | −6.2838E−03 |
| S14 | −1.3930E+00 | 2.8736E−01 | −6.8808E−02 | 2.4830E−02 | −1.1453E−02 |

| Surface number | $A_{14}$ | $A_{16}$ | $A_{18}$ | $A_{20}$ |
|---|---|---|---|---|
| S1 | −7.7082E−04 | 6.2629E−04 | 7.4863E−05 | 2.7191E−05 |
| S2 | 2.4575E−03 | 4.3462E−04 | −1.1426E−04 | −4.9877E−05 |
| S3 | 5.2786E−02 | −1.5372E−02 | 6.7203E−04 | 4.2832E−04 |
| S4 | 1.5963E−05 | 7.1751E−06 | 2.9254E−06 | 1.0992E−07 |
| S5 | 1.0282E−05 | 5.1835E−06 | 3.0852E−06 | 0.0000E+00 |
| S6 | 3.8376E−06 | 9.9936E−06 | 9.0414E−07 | 0.0000E+00 |
| S7 | 8.1327E−06 | 1.7720E−05 | 4.1857E−06 | 0.0000E+00 |
| S8 | 3.4327E−05 | −9.5657E−06 | 1.5055E−05 | 0.0000E+00 |
| S9 | −1.4551E−04 | −3.6301E−05 | 1.6331E−05 | 0.0000E+00 |
| S10 | 6.8691E−05 | −9.5134E−05 | −4.3915E−05 | 0.0000E+00 |
| S11 | −1.1157E−03 | 1.4194E−05 | 8.7723E−05 | 0.0000E+00 |
| S12 | 1.2376E+00 | −5.2794E−01 | 1.2743E−01 | −1.3233E−02 |
| S13 | 2.6382E−03 | −1.3638E−03 | 3.3217E−04 | 0.0000E+00 |
| S14 | 9.3032E−04 | −1.2540E−03 | 9.9501E−05 | 3.2411E−05 |

Figures 6A, 6B:
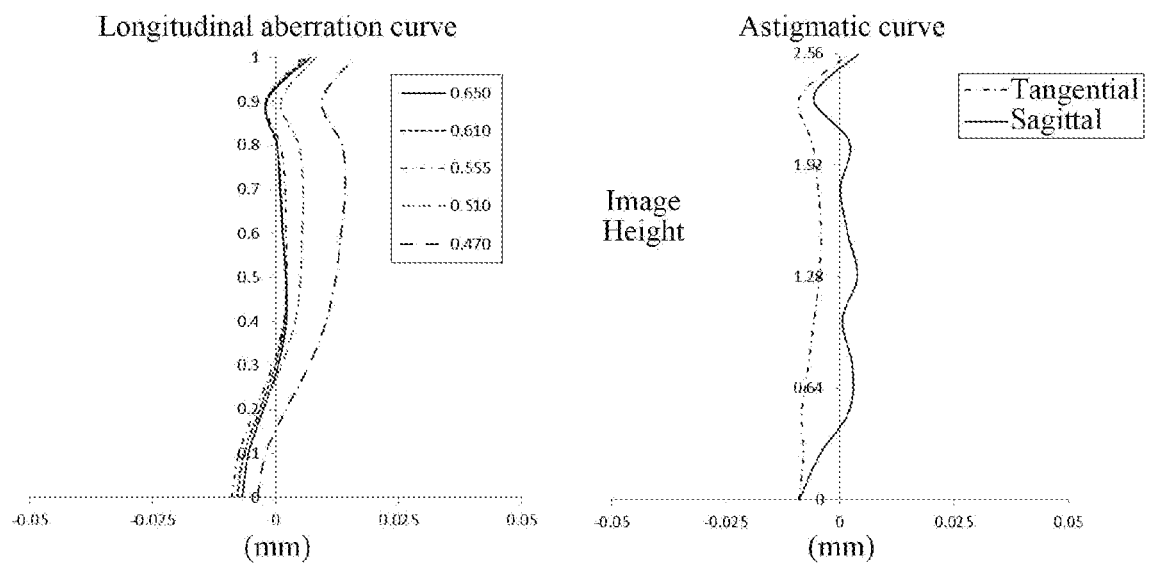
FIGS. 6A-6D respectively show a longitudinal aberration curve, an astigmatism curve, a distortion curve and a lateral color curve of the optical imaging system of Example 3.
Figure 6C:
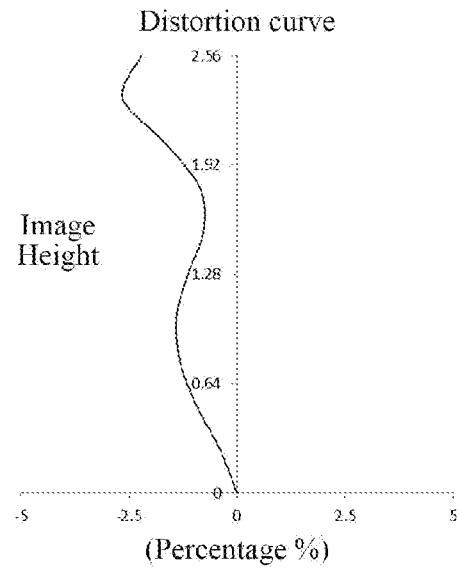
Figure 6D:
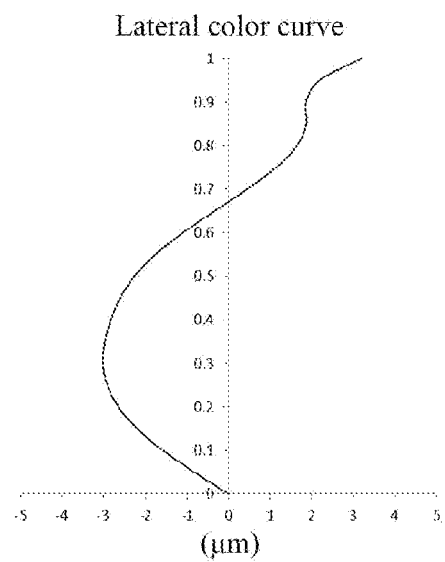

FIG. 6A shows a longitudinal aberration curve of the optical imaging system according to example 3, representing deviations of focal points converged by light of different wavelengths after passing through the lens assembly. FIG. 6B shows an astigmatic curve of the optical imaging system according to example 3, representing a curvature of a tangential plane and a curvature of a sagittal plane. FIG. 6C shows a distortion curve of the optical imaging system according to example 3, representing amounts of distortion corresponding to different image heights. FIG. 6D shows a lateral color curve of the optical imaging system according to example 3, representing deviations of different image heights on an imaging plane after light passes through the lens assembly. It can be seen from FIG. 6A to FIG. 6D that the optical imaging system provided in example 3 can achieve good image quality.

Example 4

Figure 7:
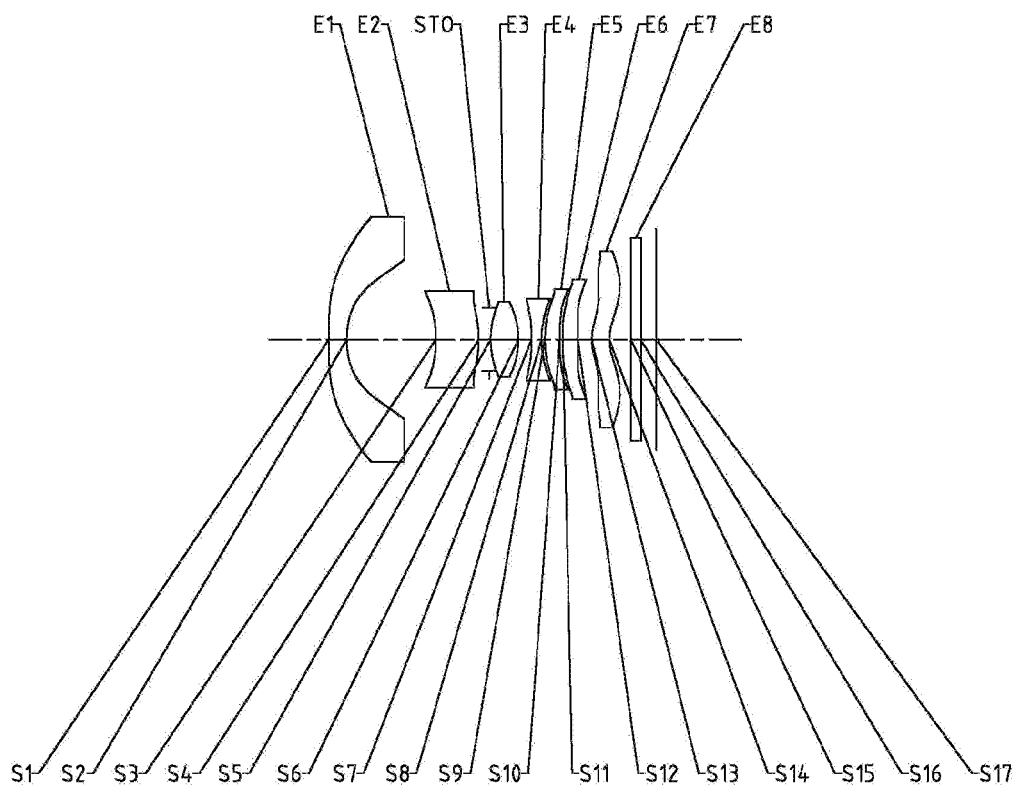
FIG. 7 shows a schematic structural diagram of an optical imaging system according to Example 4 of the present disclosure.

An optical imaging system according to example 4 of the present disclosure is described below with reference to FIG. 7 to FIG. 8D. FIG. 7 shows a schematic structural view of the optical imaging system according to example 4 of the present disclosure.

As shown in FIG. 7, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has a negative refractive power, an object side surface S1 of the first lens is a convex surface, and an image side surface S2 of the first lens is a concave surface. The second lens E2 has a positive refractive power, an object side surface S3 of the second lens is a concave surface, and an image side surface S4 of the second lens is a convex surface. The third lens E3 has a positive refractive power, an object side surface S5 of the third lens is a convex surface, and an image side surface S6 of the third lens is a convex surface. The fourth lens E4 has a negative refractive power, an object side surface S7 of the fourth lens is a convex surface, and an image side surface S8 of the fourth lens is a concave surface. The fifth lens E5 has a positive refractive power, an object side surface S9 of the fifth lens is a convex surface, and an image side surface S10 of the fifth lens is a convex surface. The sixth lens E6 has a negative refractive power, an object side surface S11 of the sixth lens is a concave surface, and an image side surface S12 of the sixth lens is a concave surface. The seventh lens E7 has a positive refractive power, an object side surface S13 of the seventh lens is a convex surface, and an image side surface S14 of the seventh lens is a concave surface. The optical filter E8 has an object side surface S15 and an image side surface S16. Light from an object sequentially passes through the respective surfaces S1 to S16 and is finally imaged on the imaging plane S17.

In this example, a total effective focal length f of the optical imaging system satisfies f=1.67 mm, a total length TTL of the optical imaging system satisfies TTL=7.70 mm, half of a diagonal length ImgH of an effective pixel area on the imaging plane S17 of the optical imaging system satisfies ImgH=2.56 mm, and half of a maximal field-of-view Semi-FOV of the optical imaging system satisfies Semi-FOV=57.4°, and the aperture value Fno of the optical imaging system satisfies Fno=2.20.

Table 7 is a table showing basic parameters of the optical imaging system of example 4, wherein the units for the radius of curvature, the thickness/distance and the focal length are millimeter (mm). Table 8 shows the higher-order coefficients that can be used for each aspheric surface in Example 4, where each aspheric surface type can be defined by the formula (1) given in Example 1 above.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| S1 | Aspheric | 30.6898 | 0.4221 | 1.55 | 56.1 | −4.42 | 48.9115 |
| S2 | Aspheric | 2.2258 | 2.0966 | | | | −0.6929 |
| S3 | Aspheric | −3.2010 | 1.0076 | 1.55 | 56.1 | 13.91 | 1.6220 |
| S4 | Aspheric | −2.5020 | 0.2471 | | | | −0.0028 |
| STO | Spherical | Infinite | 0.0300 | | | | |
| S5 | Aspheric | 2.0073 | 0.6514 | 1.55 | 56.1 | 2.09 | −1.5943 |
| S6 | Aspheric | −2.3417 | 0.3065 | | | | 2.9860 |
| S7 | Aspheric | 1500.0000 | 0.2350 | 1.68 | 19.2 | −2.53 | −99.0000 |
| S8 | Aspheric | 1.7122 | 0.0834 | | | | 0.3951 |
| S9 | Aspheric | 3.1512 | 0.3454 | 1.57 | 37.3 | 5.25 | −17.9634 |
| S10 | Aspheric | −56.8959 | 0.0721 | | | | 99.0000 |
| S11 | Aspheric | −12.6310 | 0.3545 | 1.54 | 55.8 | −23.32 | 42.2209 |
| S12 | Aspheric | 1376.9381 | 0.3255 | | | | 99.0000 |
| S13 | Aspheric | 1.0269 | 0.4148 | 1.54 | 55.8 | 13.32 | −1.2012 |
| S14 | Aspheric | 1.0300 | 0.5041 | | | | −2.0859 |
| S15 | Spherical | Infinite | 0.2436 | 1.52 | 64.2 | | |
| S16 | Spherical | Infinite | 0.3604 | | | | |
| S17 | Spherical | Infinite | | | | | |

TABLE 8

| Surface number | $A_4$ | $A_6$ | $A_8$ | $A_{10}$ | $A_{12}$ |
|---|---|---|---|---|---|
| S1 | 9.5923E−01 | −1.7709E−01 | 4.4794E−02 | −6.5089E−03 | 5.6109E−03 |
| S2 | 6.1305E−01 | −8.5008E−02 | −2.7635E−02 | −4.2209E−03 | 4.3064E−03 |
| S3 | −5.6740E−02 | 3.8919E−02 | −5.3007E−02 | 9.2889E−02 | −9.0594E−02 |
| S4 | 2.9583E−02 | 5.0991E−03 | 6.8989E−04 | 2.1087E−04 | 5.8717E−05 |
| S5 | 5.8965E−03 | 3.3235E−04 | −4.8811E−05 | 6.2316E−05 | −1.5018E−06 |
| S6 | −1.9963E−02 | 7.5656E−03 | −3.5005E−04 | 1.7908E−04 | −6.3565E−06 |
| S7 | −1.2333E−01 | 2.4114E−02 | −2.9936E−03 | 6.1925E−04 | −1.5908E−04 |
| S8 | −1.1030E−01 | 1.9498E−02 | −2.3304E−03 | 1.2281E−03 | −2.2667E−04 |
| S9 | 1.0191E−01 | −1.3774E−02 | −4.4951E−04 | −2.2861E−03 | 1.3910E−04 |
| S10 | 2.3450E−01 | −3.1679E−02 | 8.6510E−03 | −1.0758E−02 | 3.1709E−03 |

TABLE 8-continued

| | | | | | |
|---|---|---|---|---|---|
| S11 | 3.4316E−01 | −8.0017E−02 | 2.8674E−02 | −7.8486E−03 | 2.6696E−03 |
| S12 | −2.2819E−01 | 9.4865E−01 | −1.5601E+00 | 1.9161E+00 | −1.8404E+00 |
| S13 | −1.6403E+00 | 4.2468E−01 | −1.0600E−01 | 2.0927E−02 | −6.2177E−03 |
| S14 | −1.3701E+00 | 2.8257E−01 | −6.7648E−02 | 2.4535E−02 | −1.0678E−02 |

| Surface number | $A_{14}$ | $A_{16}$ | $A_{18}$ | $A_{20}$ |
|---|---|---|---|---|
| S1 | −8.6602E−04 | 5.4157E−04 | 7.7908E−05 | 1.6293E−05 |
| S2 | 2.5235E−03 | 3.4188E−04 | −1.3617E−04 | −4.1828E−05 |
| S3 | 5.2786E−02 | −1.5372E−02 | 6.7203E−04 | 4.2832E−04 |
| S4 | 1.2127E−05 | 5.7100E−06 | 1.6929E−06 | −3.3475E−07 |
| S5 | 1.0544E−05 | 4.5101E−06 | 3.1803E−06 | 0.0000E+00 |
| S6 | 2.9205E−06 | 1.0021E−05 | 2.0368E−07 | 0.0000E+00 |
| S7 | 7.4911E−06 | 1.8284E−05 | 2.7676E−06 | 0.0000E+00 |
| S8 | 2.2903E−05 | −5.4156E−06 | 1.2208E−05 | 0.0000E+00 |
| S9 | −1.5923E−04 | −3.3914E−05 | 1.2473E−05 | 0.0000E+00 |
| S10 | 9.9032E−05 | −8.2252E−05 | −4.4435E−05 | 0.0000E+00 |
| S11 | −1.0402E−03 | 6.1055E−06 | 8.3660E−05 | 0.0000E+00 |
| S12 | 1.2376E+00 | −5.2794E−01 | 1.2743E−01 | −1.3233E−02 |
| S13 | 2.5495E−03 | −1.2867E−03 | 3.1895E−04 | 0.0000E+00 |
| S14 | 7.1898E−04 | −1.2341E−03 | 3.4894E−05 | 5.3694E−05 |

Figure 8A:
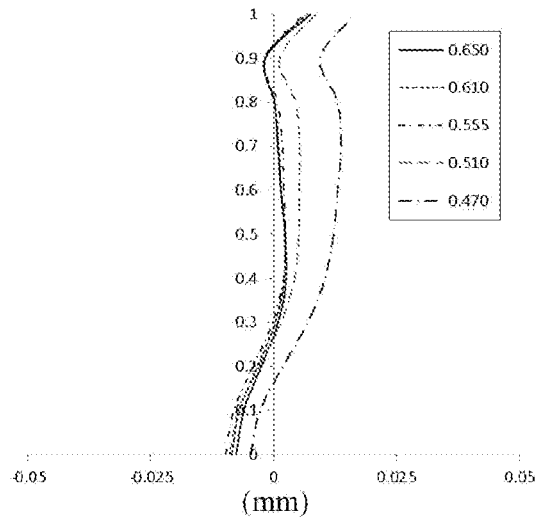
FIGS. 8A-8D respectively show a longitudinal aberration curve, an astigmatism curve, a distortion curve and a lateral color curve of the optical imaging system of Example 4.
Figure 8B:
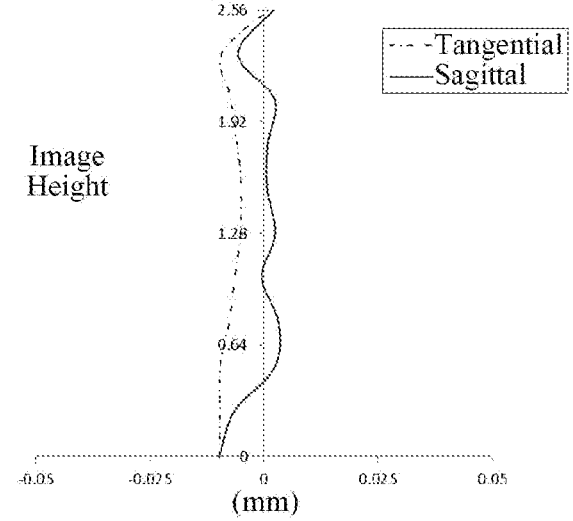
Figure 8C:
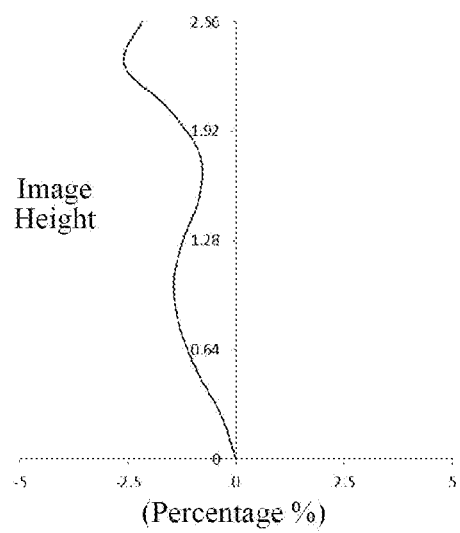
Figure 8D:
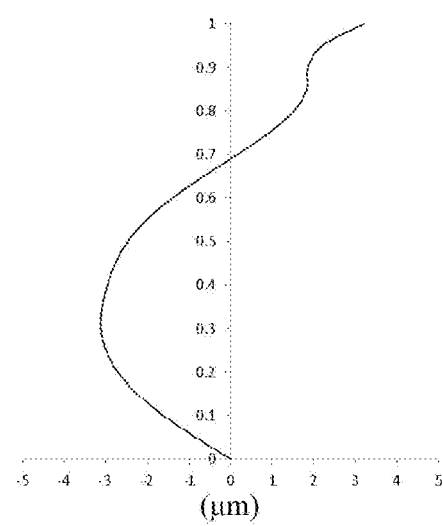

FIG. 8A shows a longitudinal aberration curve of the optical imaging system according to example 4, representing deviations of focal points converged by light of different wavelengths after passing through the lens assembly. FIG. 8B shows an astigmatic curve of the optical imaging system according to example 4, representing a curvature of a tangential plane and a curvature of a sagittal plane. FIG. 8C shows a distortion curve of the optical imaging system according to example 4, representing amounts of distortion corresponding to different image heights. FIG. 8D shows a lateral color curve of the optical imaging system according to example 4, representing deviations of different image heights on an imaging plane after light passes through the lens assembly. It can be seen from FIG. 8A to FIG. 8D that the optical imaging system provided in example 4 can achieve good image quality.

Example 5

Figure 9:
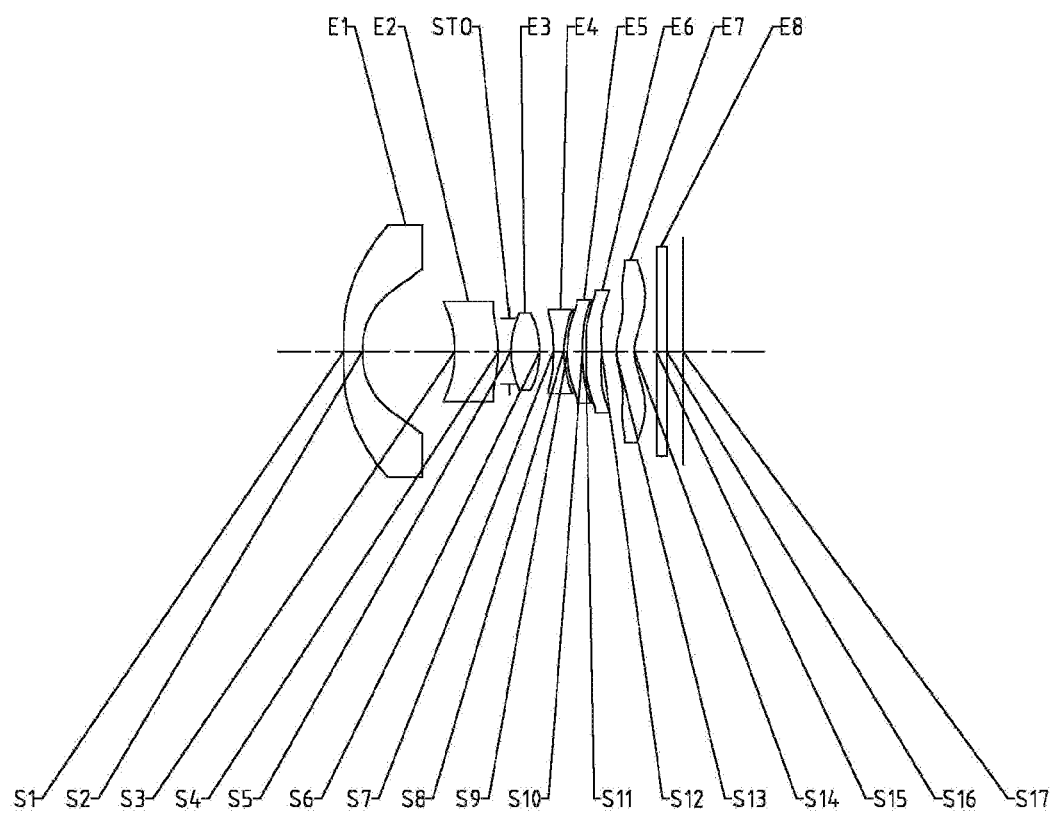
FIG. 9 shows a schematic structural diagram of an optical imaging system according to Example 5 of the present disclosure.

An optical imaging system according to example 5 of the present disclosure is described below with reference to FIG. 9 to FIG. 10D. FIG. 9 shows a schematic structural view of the optical imaging system according to example 5 of the present disclosure.

As shown in FIG. 9, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has a negative refractive power, an object side surface S1 of the first lens is a convex surface, and an image side surface S2 of the first lens is a concave surface. The second lens E2 has a positive refractive power, an object side surface S3 of the second lens is a concave surface, and an image side surface S4 of the second lens is a convex surface. The third lens E3 has a positive refractive power, an object side surface S5 of the third lens is a convex surface, and an image side surface S6 of the third lens is a convex surface. The fourth lens E4 has a negative refractive power, an object side surface S7 of the fourth lens is a concave surface, and an image side surface S8 of the fourth lens is a concave surface. The fifth lens E5 has a positive refractive power, an object side surface S9 of the fifth lens is a convex surface, and an image side surface S10 of the fifth lens is a convex surface. The sixth lens E6 has a negative refractive power, an object side surface S11 of the sixth lens is a concave surface, and an image side surface S12 of the sixth lens is a convex surface. The seventh lens E7 has a positive refractive power, an object side surface S13 of the seventh lens is a convex surface, and an image side surface S14 of the seventh lens is a concave surface. The optical filter E8 has an object side surface S15 and an image side surface S16. Light from an object sequentially passes through the respective surfaces S1 to S16 and is finally imaged on the imaging plane S17.

In this example, a total effective focal length f of the optical imaging system satisfies f=1.68 mm, a total length TTL of the optical imaging system satisfies TTL=7.70 mm, half of a diagonal length ImgH of an effective pixel area on the imaging plane S17 of the optical imaging system satisfies ImgH=2.56 mm, and half of a maximal field-of-view Semi-FOV of the optical imaging system satisfies Semi-FOV=57.3°, and the aperture value Fno of the optical imaging system satisfies Fno=2.20.

Table 9 is a table showing basic parameters of the optical imaging system of example 5, wherein the units for the radius of curvature, the thickness/distance and the focal length are millimeter (mm). Table 10 shows the higher-order coefficients that can be used for each aspheric surface in Example 5, where each aspheric surface type can be defined by the formula (1) given in Example 1 above.

TABLE 9

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| S1 | Aspheric | 29.8001 | 0.4200 | 1.55 | 56.1 | −4.44 | 45.8885 |
| S2 | Aspheric | 2.2283 | 2.1003 | | | | −0.6954 |
| S3 | Aspheric | −3.1884 | 0.9910 | 1.55 | 56.1 | 15.07 | 1.6192 |
| S4 | Aspheric | −2.5500 | 0.2522 | | | | 0.2007 |
| STO | Spherical | Infinite | 0.0300 | | | | |
| S5 | Aspheric | 1.9677 | 0.6555 | 1.55 | 56.1 | 2.07 | −1.5994 |
| S6 | Aspheric | −2.3471 | 0.3079 | | | | 3.0748 |
| S7 | Aspheric | −1057.0369 | 0.2350 | 1.68 | 19.2 | −2.53 | −99.0000 |
| S8 | Aspheric | 1.7158 | 0.0837 | | | | 0.3879 |
| S9 | Aspheric | 3.2143 | 0.3448 | 1.57 | 37.3 | 5.31 | −18.1291 |
| S10 | Aspheric | −49.6360 | 0.0721 | | | | 99.0000 |
| S11 | Aspheric | −12.0978 | 0.3576 | 1.54 | 55.8 | −26.56 | 50.2274 |
| S12 | Aspheric | −80.7191 | 0.3285 | | | | −99.0000 |
| S13 | Aspheric | 1.0345 | 0.4154 | 1.54 | 55.8 | 14.29 | −1.1894 |
| S14 | Aspheric | 1.0281 | 0.5030 | | | | −2.0888 |
| S15 | Spherical | Infinite | 0.2436 | 1.52 | 64.2 | | |
| S16 | Spherical | Infinite | 0.3593 | | | | |
| S17 | Spherical | Infinite | | | | | |

TABLE 10

| Surface bumber | $A_4$ | $A_6$ | $A_8$ | $A_{10}$ | $A_{12}$ |
|---|---|---|---|---|---|
| S1 | 9.5295E−01 | −1.7642E−01 | 4.3708E−02 | −6.8700E−03 | 5.4037E−03 |
| S2 | 6.1436E−01 | −8.6475E−02 | −2.8181E−02 | −4.6336E−03 | 4.2798E−03 |
| S3 | −5.6728E−02 | 3.8906E−02 | −5.2948E−02 | 9.2942E−02 | −9.0594E−02 |
| S4 | 2.8047E−02 | 5.2009E−03 | 6.4857E−04 | 2.0846E−04 | 5.4928E−05 |
| S5 | 5.0202E−03 | 3.9343E−04 | −5.8331E−05 | 6.1604E−05 | −1.1190E−06 |
| S6 | −1.9315E−02 | 7.9536E−03 | −3.2958E−03 | 1.9548E−04 | −2.3265E−06 |
| S7 | −1.2553E−01 | 2.4713E−02 | −3.0291E−03 | 6.0549E−04 | −1.5155E−04 |
| S8 | −1.1098E−01 | 1.9976E−02 | −2.3420E−03 | 1.2385E−03 | −2.2811E−04 |
| S9 | 1.0160E−01 | −1.3923E−02 | −4.9912E−04 | −2.2234E−03 | 1.4784E−04 |
| S10 | 2.3516E−01 | −3.2102E−02 | 8.7420E−03 | −1.0755E−02 | 3.2290E−03 |
| S11 | 3.4155E−01 | −7.8911E−02 | 2.8467E−02 | −7.7356E−03 | 2.6099E−03 |
| S12 | −2.2717E−01 | 9.4869E−01 | −1.5601E+00 | 1.9160E+00 | −1.8404E+00 |
| S13 | −1.6666E+00 | 4.3573E−01 | −1.1048E−01 | 2.1921E−02 | −6.5303E−03 |
| S14 | −1.3894E+00 | 2.9116E−01 | −6.8807E−02 | 2.4829E−02 | −1.1912E−02 |

| Surface bumber | $A_{14}$ | $A_{16}$ | $A_{18}$ | $A_{20}$ |
|---|---|---|---|---|
| S1 | −8.6520E−04 | 5.8179E−04 | 7.2185E−05 | 2.5672E−05 |
| S2 | 2.4803E−03 | 3.9501E−04 | −1.3525E−04 | −4.4355E−05 |
| S3 | 5.2786E−02 | −1.5372E−02 | 6.7203E−04 | 4.2832E−04 |
| S4 | 1.2808E−05 | 5.0587E−06 | 2.1091E−06 | −5.1148E−07 |
| S5 | 9.5096E−06 | 4.4555E−06 | 3.0583E−06 | 0.0000E+00 |
| S6 | 8.0261E−06 | 1.2075E−05 | 1.4586E−06 | 0.0000E+00 |
| S7 | 1.1026E−05 | 1.9123E−05 | 4.1645E−06 | 0.0000E+00 |
| S8 | 2.6727E−05 | −7.0368E−06 | 1.3431E−05 | 0.0000E+00 |
| S9 | −1.5693E−04 | −3.0656E−05 | 1.1935E−05 | 0.0000E+00 |
| S10 | 4.6852E−05 | −7.1503E−05 | −4.6221E−05 | 0.0000E+00 |
| S11 | −1.0248E−03 | 1.3036E−05 | 7.3931E−05 | 0.0000E+00 |
| S12 | 1.2376E+00 | −5.2794E−01 | 1.2743E−01 | −1.3233E−02 |
| S13 | 2.6813E−03 | −1.3524E−03 | 3.3462E−04 | 0.0000E+00 |
| S14 | 7.7851E−04 | −1.2563E−03 | 1.3521E−04 | 5.9867E−05 |

Figures 10A, 10B:
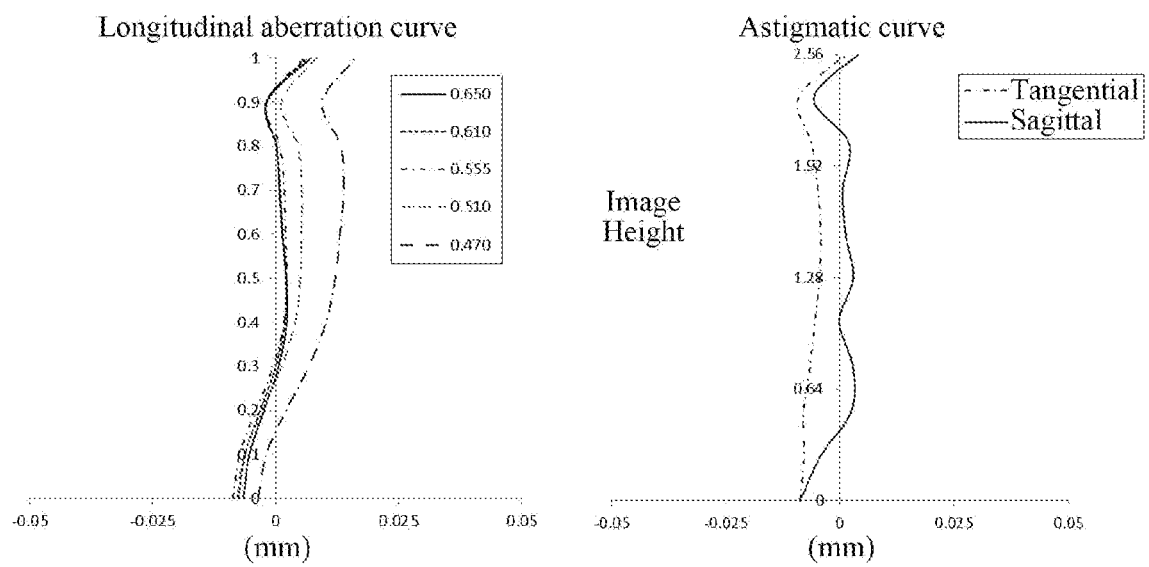
FIGS. 10A-10D respectively show a longitudinal aberration curve, an astigmatism curve, a distortion curve and a lateral color curve of the optical imaging system of Example 5.
Figure 10C:
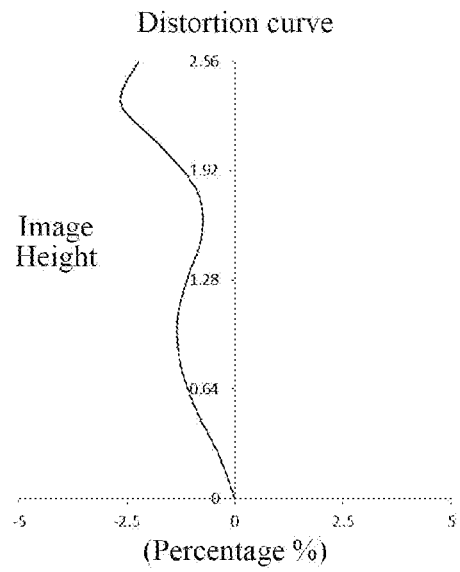
Figure 10D:
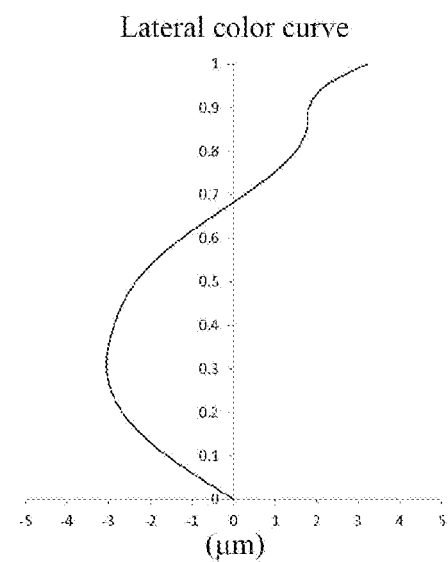

FIG. 10A shows a longitudinal aberration curve of the optical imaging system according to example 5, representing deviations of focal points converged by light of different wavelengths after passing through the lens assembly. FIG. 10B shows an astigmatic curve of the optical imaging system according to example 5, representing a curvature of a tangential plane and a curvature of a sagittal plane. FIG. 10C shows a distortion curve of the optical imaging system according to example 5, representing amounts of distortion corresponding to different image heights. FIG. 10D shows a lateral color curve of the optical imaging system according to example 5, representing deviations of different image heights on an imaging plane after light passes through the lens assembly. It can be seen from FIG. 10A to FIG. 10D that the optical imaging system provided in example 5 can achieve good image quality.

Example 6

Figure 11:
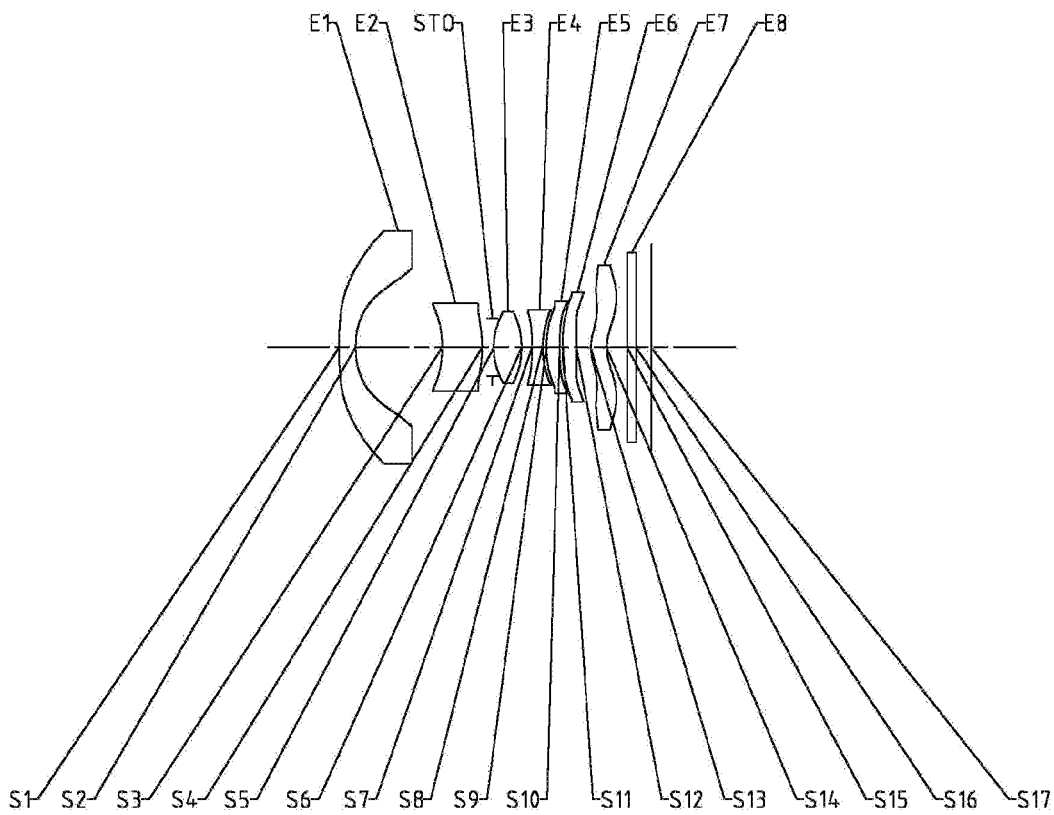
FIG. 11 shows a schematic structural diagram of an optical imaging system according to Example 6 of the present disclosure.

An optical imaging system according to example 6 of the present disclosure is described below with reference to FIG. 11 to FIG. 12D. FIG. 11 shows a schematic structural view of the optical imaging system according to example 6 of the present disclosure.

As shown in FIG. 11, the optical imaging system includes a first lens E1, a second lens E2, a stop STO, a third lens E3, a fourth lens E4, a fifth lens E5, a sixth lens E6, a seventh lens E7, an optical filter E8 and an imaging plane S17, which are sequentially arranged from an object side to an image side.

The first lens E1 has a negative refractive power, an object side surface S1 of the first lens is a convex surface, and an image side surface S2 of the first lens is a concave surface. The second lens E2 has a negative refractive power, an object side surface S3 of the second lens is a concave surface, and an image side surface S4 of the second lens is a convex surface. The third lens E3 has a positive refractive power, an object side surface S5 of the third lens is a convex surface, and an image side surface S6 of the third lens is a convex surface. The fourth lens E4 has a negative refractive power, an object side surface S7 of the fourth lens is a convex surface, and an image side surface S8 of the fourth lens is a concave surface. The fifth lens E5 has a positive refractive power, an object side surface S9 of the fifth lens is a convex surface, and an image side surface S10 of the fifth lens is a convex surface. The sixth lens E6 has a negative refractive power, an object side surface S11 of the sixth lens is a concave surface, and an image side surface S12 of the sixth lens is a convex surface. The seventh lens E7 has a positive refractive power, an object side surface S13 of the seventh lens is a convex surface, and an image side surface S14 of the seventh lens is a concave surface. The optical filter E8 has an object side surface S15 and an image side surface S16. Light from an object sequentially passes through the respective surfaces S1 to S16 and is finally imaged on the imaging plane S17.

In this example, a total effective focal length f of the optical imaging system satisfies f=1.55 mm, a total length TTL of the optical imaging system satisfies TTL=7.04 mm, half of a diagonal length ImgH of an effective pixel area on the imaging plane S17 of the optical imaging system satisfies ImgH=2.32 mm, and half of a maximal field-of-view Semi-FOV of the optical imaging system satisfies Semi-FOV=56.7°, and the aperture value Fno of the optical imaging system satisfies Fno=2.20.

Table 11 is a table showing basic parameters of the optical imaging system of example 6, wherein the units for the radius of curvature, the thickness/distance and the focal length are millimeter (mm). Table 12 shows the higher-order coefficients that can be used for each aspheric surface in Example 6, where each aspheric surface type can be defined by the formula (1) given in Example 1 above.

TABLE 11

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| S1 | Aspheric | 19.9253 | 0.3700 | 1.55 | 56.1 | −4.43 | 34.6898 |
| S2 | Aspheric | 2.1422 | 1.9573 | | | | −0.6346 |
| S3 | Aspheric | −2.7000 | 0.9002 | 1.55 | 56.1 | −470.09 | 1.2092 |
| S4 | Aspheric | −3.0500 | 0.2282 | | | | 1.8414 |
| STO | Spherical | Infinite | 0.0300 | | | | |
| S5 | Aspheric | 1.4973 | 0.6311 | 1.55 | 56.1 | 1.71 | −1.3237 |
| S6 | Aspheric | −2.1010 | 0.2377 | | | | 2.5664 |
| S7 | Aspheric | 38.6774 | 0.2350 | 1.68 | 19.2 | −2.32 | 76.2491 |
| S8 | Aspheric | 1.5049 | 0.0873 | | | | 0.3185 |
| S9 | Aspheric | 3.0035 | 0.3004 | 1.57 | 37.3 | 4.84 | −15.4840 |
| S10 | Aspheric | −33.0430 | 0.0726 | | | | 80.6866 |
| S11 | Aspheric | −10.2123 | 0.3041 | 1.54 | 55.8 | −22.97 | 28.8229 |
| S12 | Aspheric | −60.1514 | 0.3241 | | | | −20.6796 |
| S13 | Aspheric | 0.9228 | 0.3544 | 1.54 | 55.8 | 15.93 | −1.2170 |
| S14 | Aspheric | 0.8956 | 0.4638 | | | | −2.4041 |
| S15 | Spherical | Infinite | 0.2100 | 1.52 | 64.2 | | |
| S16 | Spherical | Infinite | 0.3338 | | | | |
| S17 | Spherical | Infinite | | | | | |

TABLE 12

| Surface number | $A_4$ | $A_6$ | $A_8$ | $A_{10}$ | $A_{12}$ |
|---|---|---|---|---|---|
| S1 | 9.2448E−01 | −1.5990E−01 | 4.2642E−02 | −7.4716E−03 | 5.3459E−03 |
| S2 | 6.1780E−01 | −1.1628E−01 | −3.2733E−02 | −3.0104E−03 | 6.7133E−03 |
| S3 | −3.2819E−02 | 6.1062E−03 | 4.6134E−04 | 6.7233E−05 | −4.1783E−05 |
| S4 | 1.4375E−02 | 4.6902E−03 | 4.4444E−04 | 1.6386E−04 | 3.2103E−05 |
| S5 | 3.0357E−03 | 1.1136E−03 | 7.0027E−07 | 3.7130E−05 | −3.0857E−05 |
| S6 | −8.4613E−03 | 8.0498E−03 | −1.2913E−05 | 3.5506E−05 | −8.2847E−05 |
| S7 | −1.1743E−01 | 2.0939E−02 | −1.8128E−03 | −1.0756E−04 | −2.0939E−04 |
| S8 | −9.7985E−02 | 1.6704E−02 | −5.8709E−04 | 6.0542E−04 | −2.5559E−04 |
| S9 | 9.3446E−02 | −1.3020E−02 | −6.7755E−04 | −2.0649E−03 | −6.9409E−05 |
| S10 | 2.1686E−01 | −2.9530E−02 | 7.4328E−03 | −9.2464E−03 | 2.7178E−03 |

TABLE 12-continued

| | | | | | |
|---|---|---|---|---|---|
| S11 | 3.1976E−01 | −7.1811E−02 | 2.7160E−02 | −6.0499E−03 | 1.8932E−03 |
| S12 | 1.9012E−01 | −8.5098E−03 | −1.4929E−02 | 1.2878E−02 | −2.8318E−03 |
| S13 | −1.5363E+00 | 4.1480E−01 | −1.0439E−01 | 2.0065E−02 | −6.3202E−03 |
| S14 | −1.1833E+00 | 2.5202E−01 | −5.2757E−02 | 1.9768E−02 | −1.1135E−02 |

| Surface number | $A_{14}$ | $A_{16}$ | $A_{18}$ | $A_{20}$ |
|---|---|---|---|---|
| S1 | −1.5310E−03 | 2.6321E−04 | −1.3375E−05 | −1.1253E−04 |
| S2 | 2.0805E−03 | −7.7406E−04 | −6.2730E−04 | −7.8450E−05 |
| S3 | 8.5551E−06 | −6.8919E−06 | 6.2514E−07 | −1.7845E−06 |
| S4 | 6.3652E−06 | 2.7716E−06 | 2.6911E−06 | −1.5403E−06 |
| S5 | 1.5064E−06 | 2.2480E−06 | 2.2508E−06 | −1.5403E−06 |
| S6 | −1.2292E−05 | 1.0975E−05 | 1.1543E−06 | 0.0000E+00 |
| S7 | 1.6736E−05 | 1.1435E−05 | 1.0167E−05 | 0.0000E+00 |
| S8 | 1.4660E−05 | −2.0066E−05 | 1.5363E−05 | 0.0000E+00 |
| S9 | −1.6047E−04 | −4.6022E−05 | −6.7299E−06 | 0.0000E+00 |
| S10 | −5.3732E−05 | 3.6084E−05 | −5.6722E−05 | 0.0000E+00 |
| S11 | −1.1884E−03 | 1.5999E−04 | 1.0671E−04 | 0.0000E+00 |
| S12 | 5.2728E−04 | −8.3670E−05 | 7.7857E−05 | −1.0104E−04 |
| S13 | 2.1619E−03 | −1.0765E−03 | 1.2679E−04 | 0.0000E+00 |
| S14 | −8.4123E−04 | −1.0968E−03 | −5.4645E−06 | 1.4285E−04 |

Figure 12A:
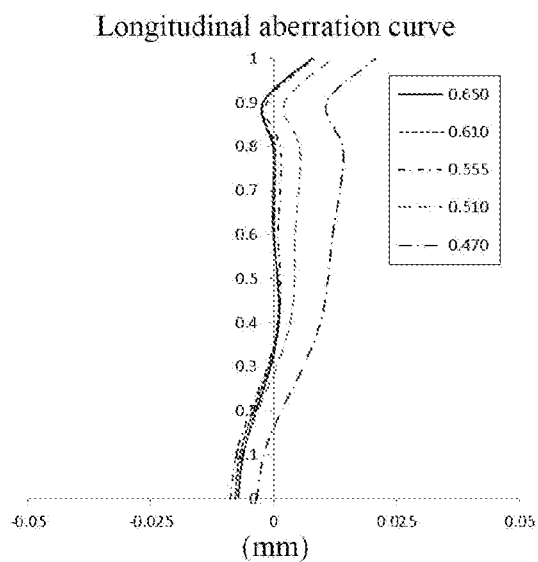
FIGS. 12A-12D respectively show a longitudinal aberration curve, an astigmatism curve, a distortion curve and a lateral color curve of the optical imaging system of Example 6.
Figure 12B:
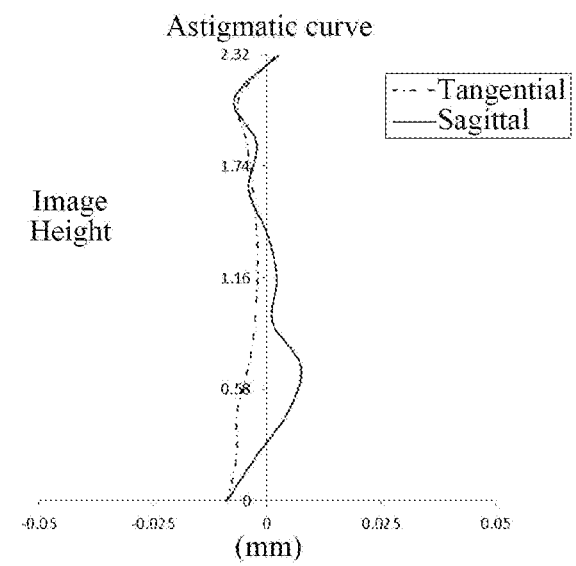
Figure 12C:
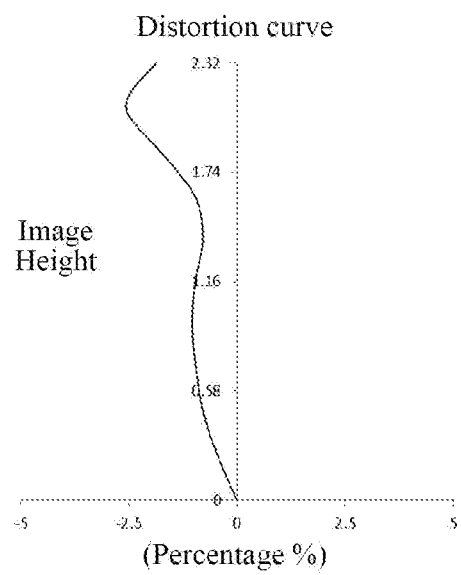
Figure 12D:
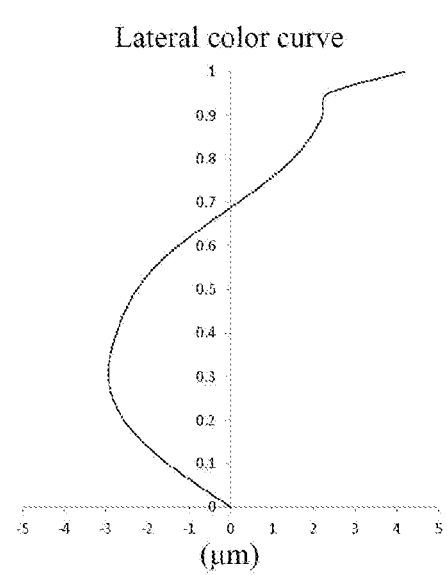

FIG. 12A shows a longitudinal aberration curve of the optical imaging system according to example 6, representing deviations of focal points converged by light of different wavelengths after passing through the lens assembly. FIG. 12B shows an astigmatic curve of the optical imaging system according to example 6, representing a curvature of a tangential plane and a curvature of a sagittal plane. FIG. 12C shows a distortion curve of the optical imaging system according to example 6, representing amounts of distortion corresponding to different image heights. FIG. 12D shows a lateral color curve of the optical imaging system according to example 6, representing deviations of different image heights on an imaging plane after light passes through the lens assembly. It can be seen from FIG. 12A to FIG. 12D that the optical imaging system provided in example 6 can achieve good image quality.

In summary, Examples 1 to 6 satisfy the relationships shown in Table 13, respectively.

TABLE 11

| | Example | | | | | |
|---|---|---|---|---|---|---|
| Conditional | 1 | 2 | 3 | 4 | 5 | 6 |
| TTL/ImgH | 3.29 | 3.09 | 3.00 | 3.00 | 3.00 | 3.03 |
| f6/f5 | −2.47 | −5.07 | −4.57 | −4.44 | −5.01 | −4.74 |
| f7/f4 | −7.10 | −6.62 | −5.45 | −5.27 | −5.65 | −6.88 |
| f1/f3 | −2.16 | −2.08 | −2.12 | −2.11 | −2.14 | −2.59 |
| R1/f1 | −6.52 | −5.65 | −6.93 | −6.94 | −6.72 | −4.50 |
| |R10/R11| | 2.49 | 6.15 | 4.75 | 4.50 | 4.10 | 3.24 |
| R6/R13 | −1.55 | −2.29 | −2.27 | −2.28 | −2.27 | −2.28 |
| (R3 + R4)/R2 | −1.92 | −2.41 | −2.57 | −2.56 | −2.58 | −2.68 |
| T12/(CT1 + CT2) | 1.45 | 1.56 | 1.45 | 1.47 | 1.49 | 1.54 |
| R14/CT7 | 3.65 | 2.83 | 2.48 | 2.48 | 2.47 | 2.53 |
| T67/T45 | 5.48 | 3.65 | 3.93 | 3.90 | 3.92 | 3.71 |
| CT3/CT4 | 3.85 | 2.29 | 2.80 | 2.77 | 2.79 | 2.69 |

The present disclosure also provides an imaging device, the electronic photosensitive element of which may be a photosensitive coupling element (CCD) or a complementary metal oxide semiconductor element (CMOS). The imaging device may be an independent imaging device such as a digital camera, or an imaging module integrated in a mobile electronic device such as a mobile phone. The imaging device is equipped with the optical imaging system described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, comprising, sequentially from an object side to an image side of the optical imaging system along an optical axis:
   a first lens having a negative refractive power;
   a second lens having a refractive power, an image-side surface of the second lens is convex surface;
   a stop;
   a third lens having a positive refractive power;
   a fourth lens having a negative refractive power;
   a fifth lens having a positive refractive power;
   a sixth lens having a negative refractive power; and
   a seventh lens having a positive refractive power,
   wherein, a half of a maximal field-of-view Semi-FOV of the optical imaging system satisfies: Semi-FOV≥55°; and
   a distance TTL from an object side surface of the first lens to an imaging plane of the optical imaging system along the optical axis and a half of a diagonal length ImgH of an effective pixel area on the imaging plane of the optical imaging system satisfy:

$$3.0 < TTL/ImgH < 3.5.$$

2. The optical imaging system according to claim 1, wherein an effective focal length f5 of the fifth lens and an effective focal length f6 of the sixth lens satisfy:

$$-5.2 < |f6/f5| < -2.4.$$

3. The optical imaging system according to claim 1, wherein an effective focal length f4 of the fourth lens and an effective focal length f7 of the seventh lens satisfy:

$$-7.5 < f7/f4 < -5.0.$$

4. The optical imaging system according to claim 1, wherein an effective focal length f1 of the first lens and an effective focal length f3 of the third lens satisfy:

$-3.0<f1/f3<-2.0$.

5. The optical imaging system according to claim 1, wherein a radius of curvature R1 of an object side surface of the first lens and an effective focal length f1 of the first lens satisfy:

$-7.0 \leq R1/f1 \leq -4.5$.

6. The optical imaging system according to claim 1, wherein a radius of curvature R10 of an image side surface of the fifth lens and a radius of curvature R11 of an object side surface of the sixth lens satisfy:

$2.4<|R10/R11|<6.5$.

7. The optical imaging system according to claim 1, wherein a radius of curvature R6 of an image side surface of the third lens and a radius of curvature R13 of an object side surface of the seventh lens satisfy:

$-3.0<R6/R13<-1.5$.

8. The optical imaging system according to claim 1, wherein a radius of curvature R2 of an image side surface of the first lens, a radius of curvature R3 of an object side surface of the second lens and a radius of curvature R4 of an image side surface of the second lens satisfy:

$-3.0<(R3+R4)/R2<-1.5$.

9. The optical imaging system according to claim 1, wherein a central thickness CT1 of the first lens along the optical axis, a central thickness CT2 of the second lens along the optical axis and a spaced interval T12 between the first lens and the second lens along the optical axis satisfy:

$1.0<T12/(CT1+CT2)<2.0$.

10. The optical imaging system according to claim 1, wherein a central thickness CT7 of the seventh lens along the optical axis and a radius of curvature R14 of an image side surface of the seventh lens satisfy:

$2.0<R14/CT7<4.0$.

11. The optical imaging system according to claim 1, wherein a spaced interval T45 between the fourth lens and the fifth lens along the optical axis and a spaced interval T67 between the sixth lens and the seventh lens along the optical axis satisfy:

$3.5<T67/T45<5.5$.

12. The optical imaging system according to claim 1, wherein a central thickness CT3 of the third lens along the optical axis and a central thickness CT4 of the fourth lens along the optical axis satisfy:

$2.0<CT3/CT4<4.0$.

13. An optical imaging system, comprising, sequentially from an object side to an image side of the optical imaging system along an optical axis:

a first lens having a negative refractive power;
a second lens having a refractive power, an image-side surface of the second lens is a convex surface;
a stop;
a third lens having a positive refractive power;
a fourth lens having a negative refractive power;
a fifth lens having a positive refractive power;
a sixth lens having a negative refractive power; and
a seventh lens having a positive refractive power,
wherein a half of a maximal field-of-view Semi-FOV of the optical imaging system satisfies: Semi-FOV≥55°; and
a spaced interval T45 between the fourth lens and the fifth lens along the optical axis and a spaced interval T67 between the sixth lens and the seventh lens along the optical axis satisfy:

$3.5<T67/T45<5.5$.

14. The optical imaging system according to claim 13, wherein an effective focal length f5 of the fifth lens and an effective focal length f6 of the sixth lens satisfy:

$-5.2<|f6/f5|<-2.4$.

15. The optical imaging system according to claim 13, wherein an effective focal length f4 of the fourth lens and an effective focal length f7 of the seventh lens satisfy:

$-7.5<f7/f4<-5.0$.

16. The optical imaging system according to claim 13, wherein an effective focal length f1 of the first lens and an effective focal length f3 of the third lens satisfy:

$-3.0<f1/f3<-2.0$.

17. The optical imaging system according to claim 13, wherein a radius of curvature R1 of an object side surface of the first lens and an effective focal length f1 of the first lens satisfy:

$-7.0 \leq R1/f1 \leq -4.5$.

18. The optical imaging system according to claim 13, wherein a radius of curvature R10 of an image side surface of the fifth lens and a radius of curvature R11 of an object side surface of the sixth lens satisfy:

$2.4<|R10/R11|<6.5$.

19. The optical imaging system according to claim 13, wherein a radius of curvature R6 of an image side surface of the third lens and a radius of curvature R13 of an object side surface of the seventh lens satisfy: $-3.0<R6/R13<-1.5$.

20. The optical imaging system according to claim 13, wherein a radius of curvature R2 of an image side surface of the first lens, a radius of curvature R3 of an object side surface of the second lens and a radius of curvature R4 of an image side surface of the second lens satisfy: $-3.0<(R3+R4)/R2<-1.5$.

* * * * *